(12) United States Patent
Veditz et al.

(10) Patent No.: US 6,507,813 B2
(45) Date of Patent: Jan. 14, 2003

(54) SYSTEM AND METHOD FOR NATIONAL LANGUAGE SUPPORT

(75) Inventors: Daniel Paul Veditz, Felton, CA (US); David Brett Schnepper, Los Gatos, CA (US)

(73) Assignee: Boland Software Corporation, Scotts Valley, CA (US)

( * ) Notice: Subject to any disclaimer, the term of this patent is extended or adjusted under 35 U.S.C. 154(b) by 0 days.

(21) Appl. No.: 10/116,180

(22) Filed: Apr. 3, 2002

(65) Prior Publication Data

US 2002/0177993 A1 Nov. 28, 2002

Related U.S. Application Data

(62) Division of application No. 08/050,957, filed on Apr. 21, 1993.

(51) Int. Cl.[7] .............................................. G06F 17/20
(52) U.S. Cl. ........................................ 704/8; 717/137
(58) Field of Search ...................... 704/1, 8; 707/103, 707/536; 341/45; 717/136, 137, 116, 146; 345/703, 746

(56) References Cited

U.S. PATENT DOCUMENTS

| | | | | |
|---|---|---|---|---|
| 4,595,980 A | * | 6/1986 | Innes ............................ 704/8 |
| 4,870,610 A | * | 9/1989 | Belfer ........................... 704/8 |
| 5,119,465 A | * | 6/1992 | Jack et al. ................... 717/137 |
| 5,201,042 A | * | 4/1993 | Weisner et al. ................ 704/8 |
| 5,251,130 A | * | 10/1993 | Andrews et al. ............... 704/8 |
| 5,307,265 A | * | 4/1994 | Winans .......................... 704/8 |
| 5,416,903 A | * | 5/1995 | Malcolm ..................... 345/703 |
| 5,434,776 A | * | 7/1995 | Jain ............................... 704/8 |
| 5,615,366 A | * | 3/1997 | Hansen ........................... 707/7 |

* cited by examiner

Primary Examiner—Patrick N. Edouard
(74) Attorney, Agent, or Firm—Darby & Darby

(57) ABSTRACT

The present invention comprises a National Language Support (NLS) system with Language Driver Identifiers (LDIDs) embedded as locale-specific descriptors within data objects. The Identifiers, which may be in the form of a system-comparable ID (e.g., ID byte), are employed by the system in several places to record the particular language (driver) which was used when a given data object was created or modified. The LDID methodology of the present invention allows the system to intelligently process data objects created or modified under one language driver with those created or modified by a different language driver. In the event of incompatibilities, the system provides error handling routines, including a preferred interface for warning users of incompatibilities and receiving user choices in response thereof.

12 Claims, 13 Drawing Sheets

DATABASE FILE HEADER (e.g., .DBF)

| Byte | Contents | Meaning |
|---|---|---|
| 0 | 1 byte | Valid dBASE IV file; bits 0-2 indicate version number, bit 3 indicates the presence of a dBASE IV memo file, bits 4-6 indicate the presence of an SQL table, bit 7 indicates the presence of any memo file (either dBASE III PLUS or dBASE IV) |
| 1-3 | 3 bytes | Date of last update; formatted as YYMMDD |
| 4-7 | 32-bit number | Number of records in the database file |
| 8-9 | 16-bit number | Number of bytes in the header |
| 10-11 | 16-bit number | Number of bytes in the record |
| 12-13 | 2 bytes | Reserved |
| 14 | 1 byte | Flag indicating incomplete transaction |
| 15 | 1 byte | Encryption flag |
| 16-27 | 12 bytes | Reserved for dBASE IV on a local area network |
| 28 | 1 byte | Production .mdx file tag; 01H if there is a production .mdx file, 00H if not |
| 29 | 1 byte | LDID → |
| 30-31 | 2 bytes | Reserved |
| 32-n*** | 32 bytes each | Field descriptor array |
| n+1 | 1 byte | 0DH as the field terminator |

LDID LOOKUP TABLE

| Language Table | LDID Value | Code Page |
|---|---|---|
| ARABIC | 7 | cp865 |
| DANISH | 8 | cp437 |
| DUTCH | 9 | cp850 |
| DUTCH2 | 10 | cp437 |
| FINNISH | 11 | cp850 |
| FINNISH2 | 12 | cp437 |
| FRENCH | 13 | cp850 |
| FRENCH2 | 14 | cp437 |
| GERMAN | 15 | cp850 |
| GERMAN2 | 16 | cp437 |
| ITALIAN | 17 | cp850 |
| ITALIAN2 | 18 | cp437 |
| JAPANESE | 19 | shift-JIS |
| SPANISH | 20 | cp850 |
| SPANISH2 | 21 | cp437 |
| SWEDISH | 22 | cp850 |
| SWEDISH2 | 23 | cp437 |
| NORWEGIAN | 24 | cp865 |
| SPANISH | 25 | cp437 |
| UK | 26 | cp850 |
| UK2 | 27 | cp437 |
| US | 28 | cp437 |
| FRENCHCAN | 29 | cp863 |
| FRENCHCAN2 | 30 | cp850 |
| FRENCHCAN3 | 31 | cp437 |
| CZECH | 32 | cp852 |
| CZECH2 | 33 | cp437 (Modified) |
| GREEK | 34 | cp852 |
| HUNGARIAN | 35 | cp852 |
| POLISH | 36 | cp867 |
| PORTUGUESE | 37 | cp860 |
| PORTUGUESE2 | 38 | cp850 |
| RUSSIAN | 39 | cp866 |

FIG. 2C

SYSTEM AND METHOD FOR NATIONAL LANGUAGE SUPPORT

The present application is a divisional of application Ser. No. 08/050,957, filed Apr. 21, 1993.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

For software publishers, overseas markets comprise an ever-growing percentage of revenues for all major PC applications. Traditionally, however, software products have been designed with little or no thought toward portability, let alone translating software products for overseas markets. As non-English speaking countries are buying more and more software from U.S. publishers, there is keen interest in improving the process of enabling or "internationalization", that is, designing and coding a software product so that it can be made to function for international use.

In the past, the process of providing National Language Support (i.e., accommodating a specific country's language, conventions, and culture) was done on a more or less ad hoc basis—essentially retrofitting software to accommodate a particular locale. Merely separating the text in a user interface from one's program is not an acceptable solution, however. Even after translating software prompts, help messages, and other textual information to the target languages, one still has to address basic issues of displaying and printing characters in the target language.

For instance, a target language will often include characters which are not defined by the default character set provided by the computer's operating system. IBM-compatible PCs running MS-DOS, for example, can display and print up to 256 different characters, the first 128 characters of which include the well-known 7-bit ASCII character set. This, of course, is not enough characters to support all languages. Some languages will obviously require a different character set; thus, sufficient means must be provided for switching character sets.

Other issues to consider when developing a system for foreign users include keyboard layout and various format conventions applicable for a particular country. Any use of currency, date, time, and the like within one's software must take into account these factors. For example, keyboards sold for European languages must include additional characters, such as letters with diacritics, and symbols, such as the British pound (£) sign.

Another potentially serious problem for localizing a program is the set of assumptions with which the underlying source code for the program was written. Assumptions made by English-speaking programmers, which were quite valid for the once-ubiquitous ASCII character set, often break down when dealing with a foreign language. For instance, the common programming technique of converting a character to uppercase by simply adding the number 32 to the character (numeric code) is often inappropriate for non-ASCII characters. Similarly, one cannot rely on standard C functions either. For instance, one cannot use simple string comparison functions like the C programming language's strcmp( ) function. Does an "ã" (i.e., an "a" with a diacritic) sort before or after a normal "a"?

One of the first serious attempts at providing National Language Support (NLS) for PCs was Microsoft's MS-DOS version 3.3. Since MS-DOS accommodates different sets of 256 characters for displaying and printing text, one may employ different characters by swapping in new character sets. Each such character set is referred to as a "code page"; the code page in use at any given time is called the "active code page." When installing operating system software, typically, a user may select a code page appropriate for his or her national language.

MS-DOS also includes an API (Application Programming Interface) having a variety of functions related to internationalization. Included are functions for inspecting code pages for determining and controlling how the keyboard, display, and printer handle characters. The API include functions, for instance, for inspecting and changing the current country code and obtaining information about the conventions associated with a current country code (e.g., how to display dates, currency, and the like).

Newer versions of MS-DOS also include support for character comparisons, through use of language-independent tables for sorting strings. Still, this is by no means a complete solution to the problem. Arabic languages, for instance, remain problematic. For one, Arabic is read and written right-to-left, not left-to-right. Also, Arabic characters require contextual analysis in order to determine which of four different shapes the Arabic characters should have (depending upon location in a word or phrase). Thus, a language may have its own special set of problems which must be addressed before international use.

To date, efforts at localization have been largely limited to ensuring that a particular program, such as an operating system or application software, is itself enabled for a particular country. When installing Microsoft® Windows, for instance, a user is asked to select a country from a list of supported countries. Windows, in turn, installs various keyboard, display, and print drivers appropriate for the selected country. This "program centric" approach is only a partial solution, however.

Consider the scenario of a corporation based in the U.S. receiving sales information from several foreign subsidiaries. Typically, such information would be transmitted as data files, such as spreadsheet or database files. In this instance, the information management system in the U.S. may be required to process data files created from a variety of foreign data processing systems, ones having character sets and conventions peculiar to a particular country. converting such data files from one language to another inevitably results in the loss of language-specific information. Once converted, the information cannot be processed (e.g., adding and deleting information records, generating reports, and the like) and then simply reconverted back to its original form. Moreover, should that information be inappropriately processed (e.g., sorting German information according to an English sort order), valuable data may be corrupted.

One approach to averting this problem is to agree, in advance, on a single data format (e.g., code page 437—the variant used in the United States and many European countries) to be used by all foreign offices of the corporation. However, this solution invites another problem: the foreign offices must forego their own National Language Support, thus compromising their own data processing needs all for the convenience of the U.S. office. And even with such an approach, the risk remains that an office may inadvertently mix data from its locale with the agreed-upon format, leading to corruption or loss of data. Needless to say, the approach is undesirable at best.

System and methods are needed which allow users of computer systems to create and freely exchange data files, irrespective of National Language Support requirements. In particular, such a system would permit a user to create an information file in his or her own locale without regard to the requirements of other systems which may need access to the very same data from that file. The present invention fulfills this and other needs.

SUMMARY OF THE INVENTION

The present invention comprises a National Language Support including a language configurator, for processing data objects in a manner which is appropriate for the language configuration of each object. The language configurator provides necessary support for a data object (which typically stores information in a particular language) so that the data object may be appropriately processed by the system.

The system of the present invention continually checks and maintains correct language configuration. A descriptor or Language Driver Identifier (LDID) (e.g., in the form of a system-comparable unit) is employed for storing in desired location(s) of a data object information specifying the language driver that was in use when the data object was created or modified. The LDID, which may be in the form of an ID byte, references a set of language driver values (e.g., lookup table of locales). This allows the system of the present invention to intelligently process data objects created or modified under one language driver with those created or modified by a different language driver. In the event of incompatibilities, the system provides error handling routines, including facilities for warning users of incompatible or otherwise illegal operations.

A data object is preferably constructed so that it embeds or stores the Language Driver Identifier directly within the object itself, so that the object is self-contained. In an exemplary construction of the data file, for instance, the file may include a header region for storing a Local Language Driver ID ("Local LDID"). This is followed by the actual information or data for the object.

The language configuration which the system currently operates under (i.e., during the current session) is also identified by the language configurator, which maintains an Active Language Driver ID (Active LDID) for referencing a Language Driver currently employed by the system (i.e., for the current session). In this manner, the Local LDID may be compared against the Active LDID, thus enabling the system to determine instances where the system is inappropriately configured for a data object about to be processed.

Actual language configuration is effected through one or more Language Drivers which, in turn, select the most appropriate language configuration table(s). Each driver is of a particular type (identified with an LDID value) and references an appropriate resource file and an appropriate character set or code page for achieving National Language Support.

BRIEF DESCRIPTION OF THE DRAWINGS

FIG. 2C is a diagram illustrating the embedding of the language identifier of the present invention within the header of a data file (.DBF file), whereby the file may be associated with a particular language driver (referenced through a lookup table).

GLOSSARY

ASCII: American Standard Code for Information Interchange; a sequence of 128 standard characters.

Code page: A character set, such as available in MS-DOS versions 3.3 and later, that provides a table for relating the binary character codes used by a program to keys on a keyboard or to the appearance of characters on a display.

Database: An organized collection of information.

Database Management System (DBMS): System that controls the organization, storage, and retrieval of information in a database.

Enabling or Internationalization: Designing and coding a product so that it can be made to function for international use. A product is enabled if a national language version can be created at minimal expense and if it does not interfere with current or planned national language support of other products.

File: A collection of information stored under one name on a disk. For example, the system tables are stored in files.

Index: A file that determines an order in which the system can access the records in a table.

Glyph: A graphic representation of a single character.

Localization: Translating and adding functions to an enabled product to accommodate a country's languages, conventions, and cultures.

National Language: A language or dialect spoken by any group of people.

National Language Support: The features of a product that accommodate a specific country, national language, local convention, culture, and the like.

National Language Version: A variant of an original product that implements National Language Support and is targeted to a particular market.

Retrofitting: Redesign and modification of a product that has not been enabled.

Table: A structure made up of rows (records) and columns (fields) that contains information.

DETAILED DESCRIPTION OF A PREFERRED EMBODIMENT

For clarity, the following description will focus on an embodiment of the present invention operative in a database environment. Specifically, since most readers will have at least some exposure to database systems, it is helpful to describe the present invention as implemented in such systems. The present invention is, however, not limited to any particular exemplary embodiment. Instead, the teachings of the present invention may be advantageously applied to a variety of applications (e.g., spreadsheets, wordprocessors, CAD programs, and the like), operating on a variety of architectures (e.g., Macintosh, MS-DOS, Windows, NextStep, UNIX, and the like). Application of the principles of the present invention is particularly advantageous in those systems where information must be shared internationally. Therefore, the following preferred embodiment and certain alternatives are offered for purposes of illustration and not limitation.

General Architecture

Figure 1A:
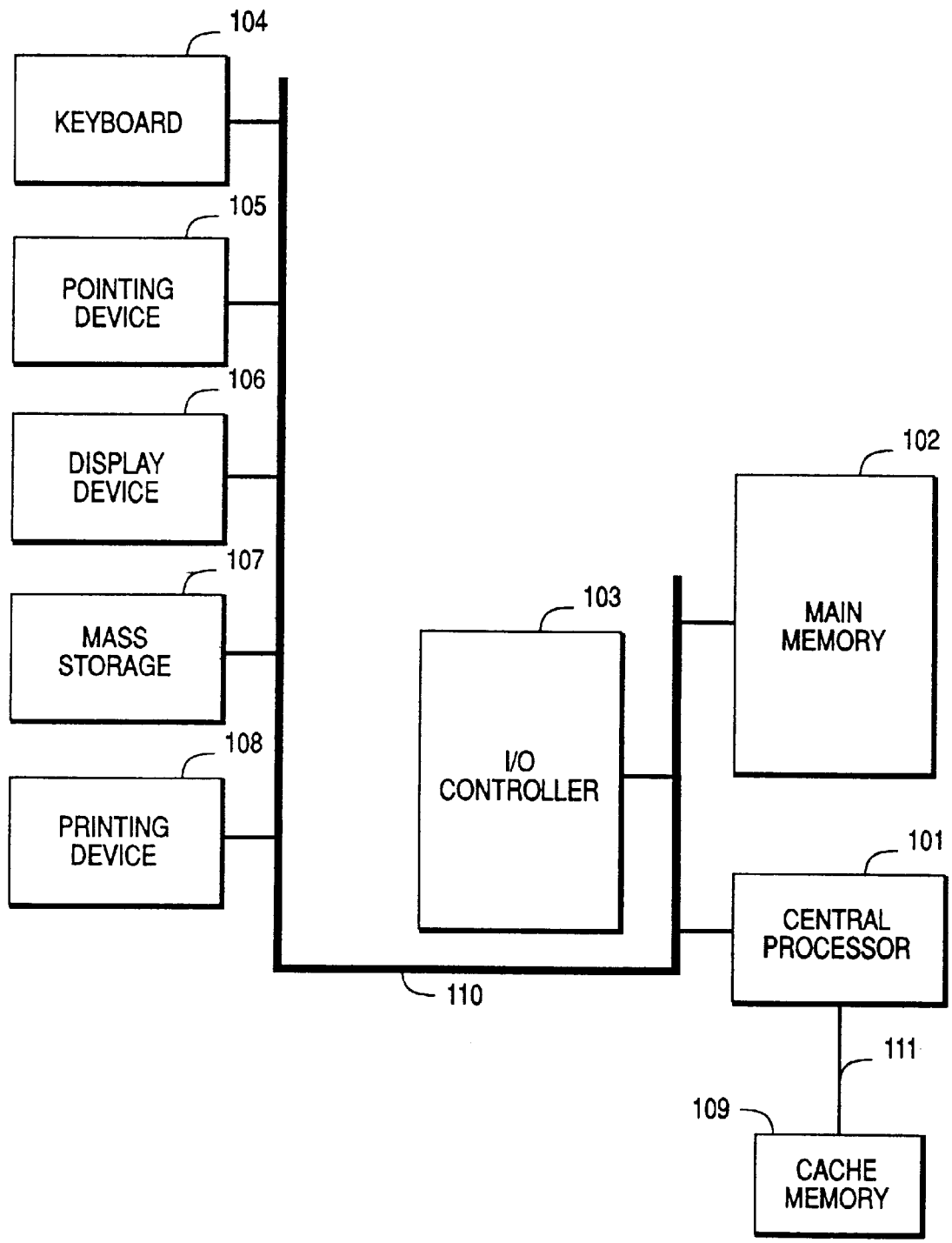
FIG. 1A is a block diagram of a computer system in which the present invention may be embodied.

The present invention may be embodied on a computer system such as the system 100 of FIG. 1A, which includes a central processor 101, a main memory 102 (e.g., random-access memory or RAM), an input/output controller 103, a keyboard 104, a pointing device 105 (e.g., mouse, track ball, pen device, or the like), a display device 106, and a non-volatile or mass storage 107 (e.g., hard or fixed disk, optical disk, magneto-optical disk, or flash memory). Processor 101 includes or is coupled to a cache memory 109 for storing frequently accessed information; memory 109 may be an on-chip cache or external cache (as shown). System 100 may also be provided with additional input/output devices, such as a printing device 108, as desired. The various components of the system 100 communicate through a system bus 110 or similar architecture, as shown.

Figure 1B:
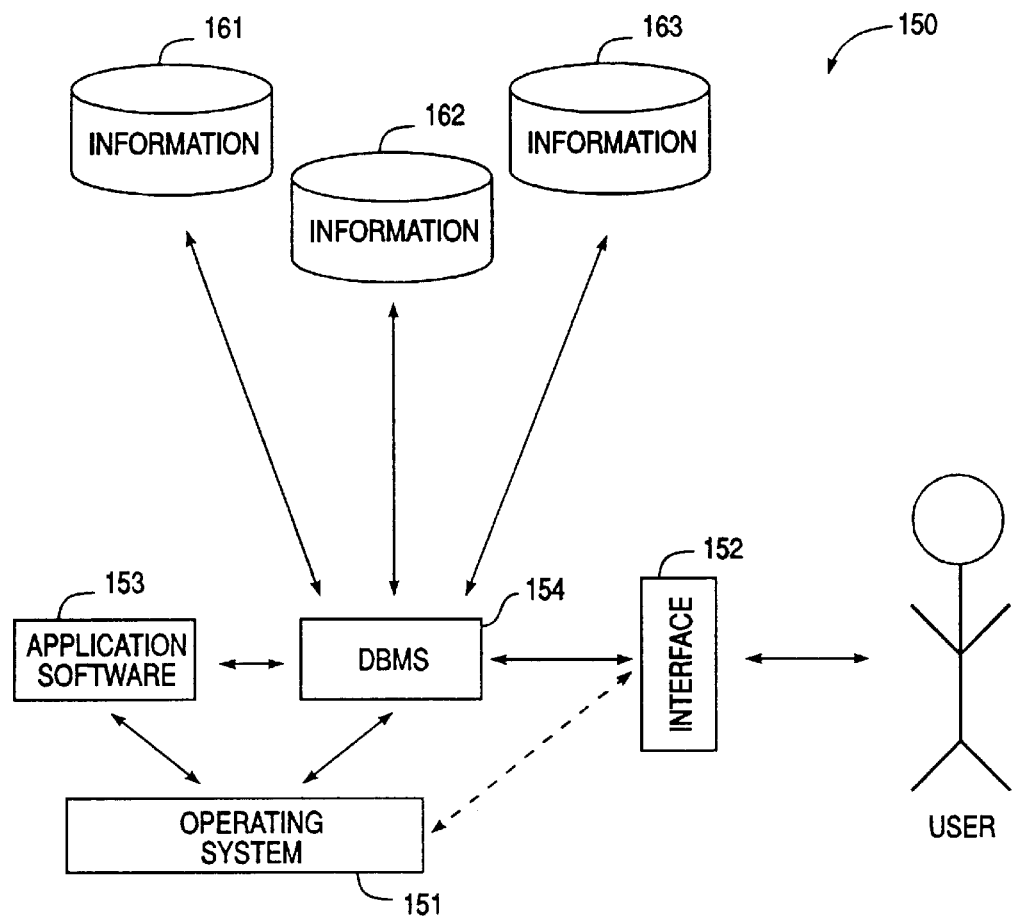
FIG. 1B is a block diagram of a software system of the present invention, which includes operating system (OS), database management system (DBMS) and application software, and user interface components.

Illustrated in FIG. 1B, a computer software system 150 is provided for programming the operation of the computer system 100. Software system 150, which is stored in system memory 102 and on disk memory 107, includes a kernel or operating system 151 and a database management system (DBMS) 154. OS 151 is the executive or supervisor for the system 100, directing both task management and data management.

DBMS 154, on the other hand, is a software subsystem for storing, retrieving, and manipulating information in database tables (e.g., tables 161, 162, 163). Under the command of DBMS 154, the system 100 receives user commands and data through user interface 152. Interface 152 includes a built-in query surface or editor for accessing and processing database information. Additional application programs, such as DBMS application software 153, may be "loaded" (i.e., transferred from storage 107 into memory 102) for execution by the system 100, particularly for further controlling the operation of DBMS 154.

In a preferred embodiment, the system 100 is an IBM-compatible personal computer system, available from a variety of vendors (including IBM of Armonk, N.Y.), and operating system 151 is MS-DOS operating system software, available from Microsoft of Redmond, Wash. DBMS 154 is preferably a PC database management system (PC DBMS). More preferably, DBMS 154 includes dBASE® Database Management System (available from Borland International of Scotts Valley, Calif.). As interface 152, dBASE provides a worksurface or "canvas" and command menus; a QBE query worksurface is also provided. Application software 153, in turn, includes database command-language applications (e.g., dBASES® applications), which may be executed or otherwise acted upon by the DBMS 154. For further description of the general operation of dBASE, the reader should refer to dBASE IV manuals: *Getting Started, Using dBASE IV, Language Reference,* and *Programming in dBASE IV,* all available from Borland International, and the disclosures of which are hereby incorporated by reference.

Figure 1C:
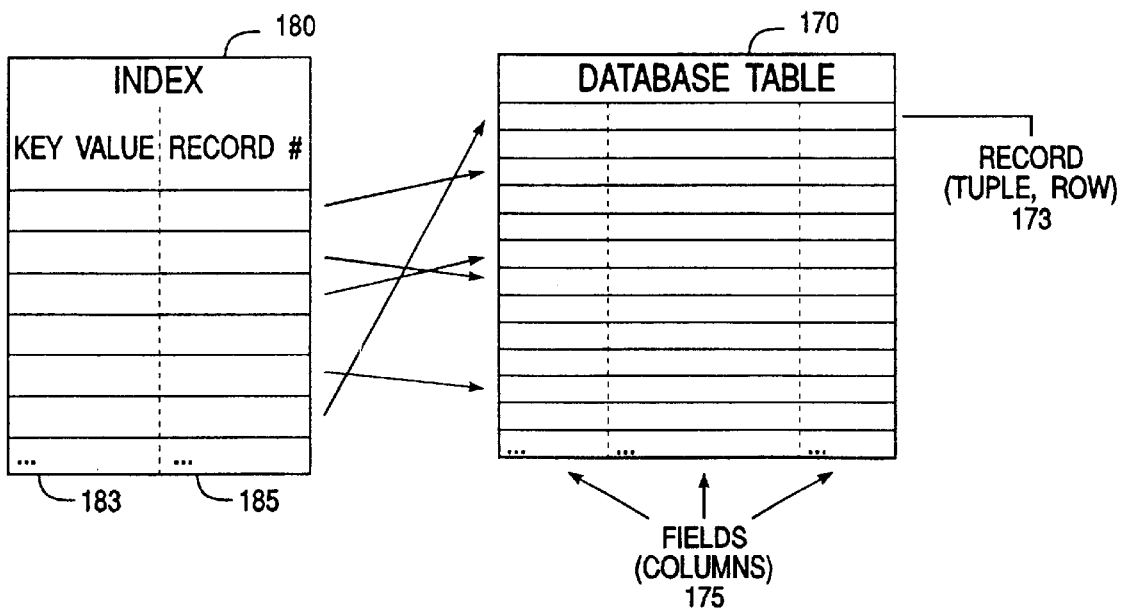
FIG. 1C is a block diagram illustrating data objects for the system of FIG. 1B, which includes a database table and its index.

At the outset, it is helpful to understand general techniques for storing information in DBMS 154. In a relational database management system, information is organized into tables, such as table 170 of FIG. 1C. As conceptually shown, table 170 typically includes horizontal rows or records (tuples) 173 and vertical columns or fields 175. A database record includes information which is most conveniently represented as a single unit. A record for an employee, for example, may include information about the employee's ID Number, Last Name and First Initial, Position, Date Hired, Social Security Number, and Salary. Thus, a typical record includes several categories of information about an individual person, place, or thing. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed.

By employing one or more database indexes, the records of a table can be organized in many different ways, depending on a particular user's needs. As shown by index 180 of FIG. 1C, for example, an index may be constructed as a single disk file which is referred to internally by the system for locating and displaying records in a database file (e.g., table 170). Index 180 stores two types of information: index key values 183 and unique record numbers 185. An index key is a data quantity composed of one or more fields from a record; keys are used to arrange (logically) the database file records by some desired order (index expression). Record numbers, on the other hand, are unique pointers to the actual storage location of each record in the database file. In this manner, an index for a database file is similar to the index of a book, which lists subject keys and page numbers that point to where the actual information is located in the book. Specifically, an index organizes (logically not physically) the records in a database file according to the values in one or more fields of interest. As such, an index may greatly speed up searching (querying) for and sorting of information.

In addition to tables and indexes, DBMSs typically provide electronic "forms" and "reports"—design documents for entering and retrieving information of interest. A form, for instance, is created for simplifying data entry by presenting a user with a screen facsimile of a real-world document which the user is already familiar with, such as a purchase order. A report, on the other hand, extracts information of interest from one or more information tables and presents it in a desired format.

Tables, indexes, forms, reports, and other user-created objects are all data-dependent components. Specifically, each component contains information in a particular language. For components to interrelate in a meaningful fashion, they must "speak the same language," or at least be compatible with a given language scenario. A database table storing information in Danish, for instance, should not be sorted by an index file which expects information to be in English. Thus, it is desirable to provide a means by which these user-created objects may interact with one another appropriately.

Preferred Configuration for National Language Support

A. Language Configuration

The problem of configuring a system, such as system 150, to operate with National Language Support is multifaceted. For instance, the problem of accurately representing the language itself—the characters which are needed for displaying and printing the written language—is by no means trivial. Moreover, many countries have specific formats for dates, currency, and the like.

Figure 2A:
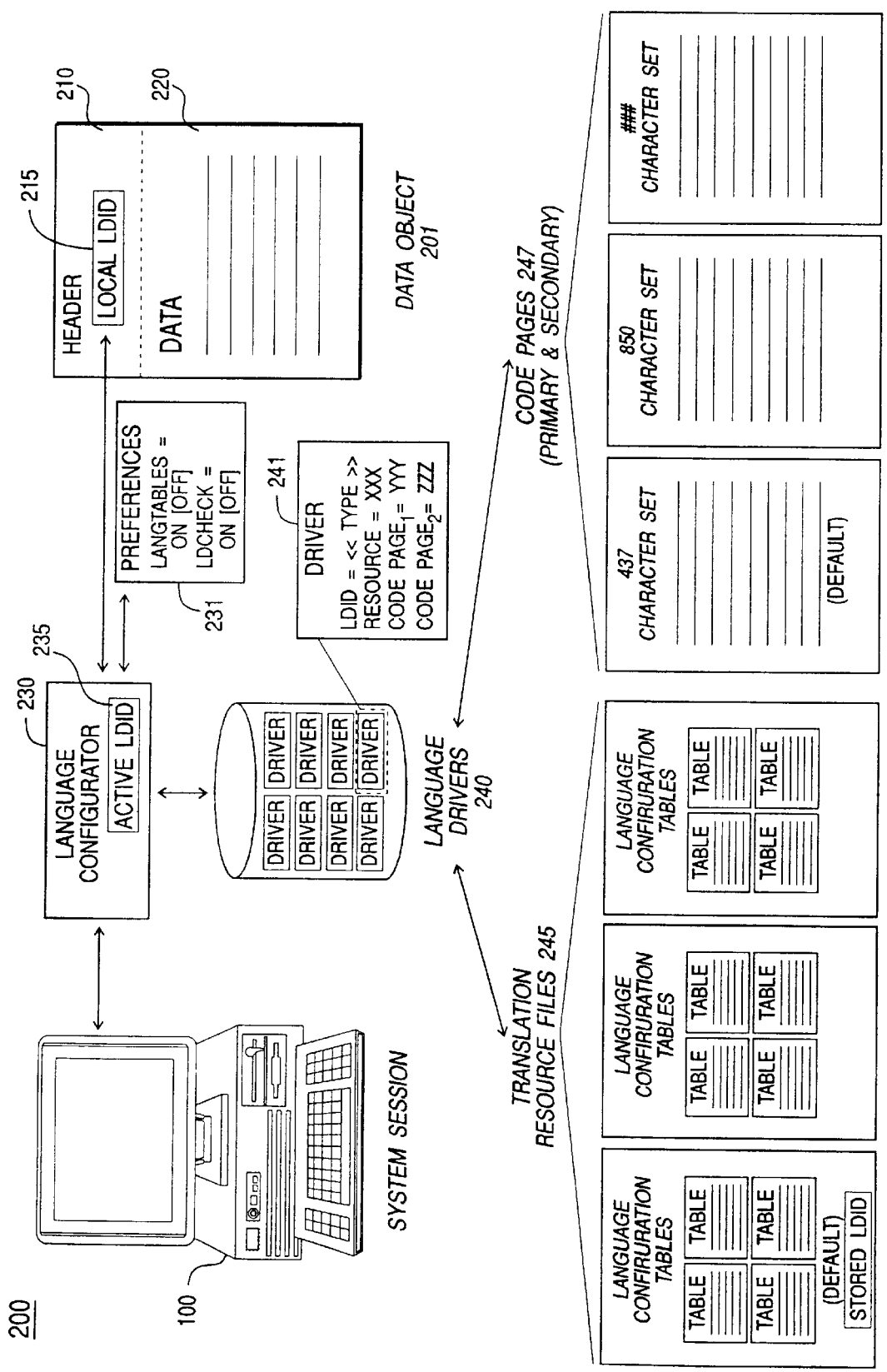
FIG. 2A is a block diagram illustrating a National Language Support (NLS) system of the present invention, which includes a language identifier embedded within each data object.
Figure 2B:
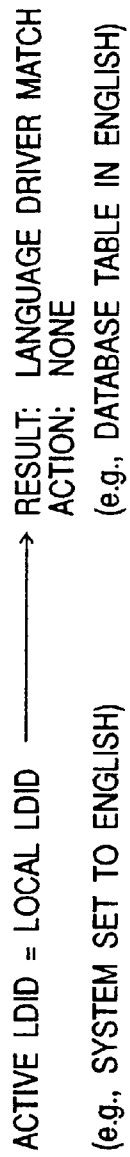
FIG. 2B is a diagram illustrating the overall operation of language driver mapping in the system of the present invention.
Figure 2B:
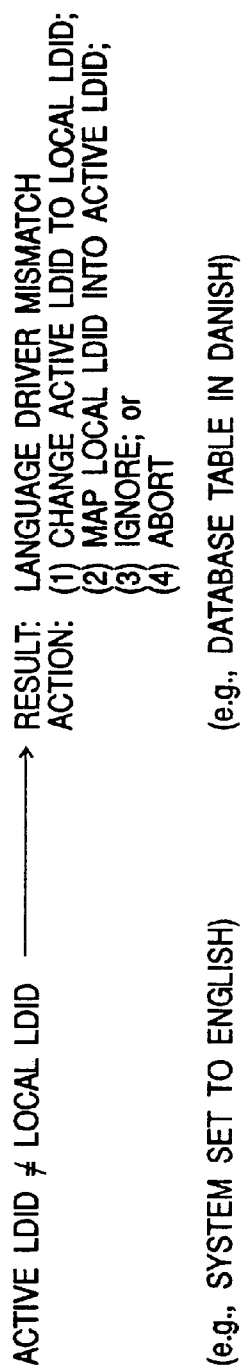

Referring now to FIGS. 2A–B, a preferred system configured for National Language Support will now be described. NLS system 200 includes the system 100 operably coupled to a language configurator 230 of the present invention. More particularly, the language configurator 230 includes means whereby the system 100 may process data objects in a manner which is appropriate for the language configuration of each object.

As shown in FIG. 2A, the language configurator 230 provides necessary support for a data object 201 (which typically stores information in a particular language) so that the data object may be appropriately processed by the system 100. In general, data objects must rely upon a code page (from code pages 247) and a translation resource file (from resource files 245) in order for its language-specific information to be interpreted properly.

As shown, the data object 201 is preferably constructed so that it embeds or stores a Language Driver Identifier 215 for indicating the language support under which the file was created (or last modified). In an exemplary construction of the data file, for instance, the file may include a header region or section 210 for storing a Local Language Driver ID ("Local LDID"); other general "housekeeping" information may be stored in the header 210 as well. Actual information or data for the data object 201, on the other hand, is stored in a data region 220, such as in the form of a plurality of sequential data records.

The language configuration which the system 100 currently operates under (i.e., during the current session) is identified by the language configurator 230, which maintains an Active Language Driver ID (Active LDID) 235 for referencing a Language Driver currently employed by the system (i.e., for the current session). In this manner, the Local LDID 215 may be compared against the Active LDID 235, thus enabling the system 200 to determine instances where the system is inappropriately configured for a data object about to be processed. As shown by the FIG. 2B, an instance where a data object was created with a language driver currently employed by the system (e.g., Active LDID and Local LDID are set to English) requires no action. If, on the other hand, there is a driver mismatch (e.g., Active LDID set to English, and Local LDID set to Danish), corrective action is required. Appropriate action may include reconfiguring the system, reconfiguring the data object (e.g., effect a new character mapping), ignoring the condition, or aborting the requested operation. In a preferred embodiment, a preferred interface is provided for allowing a user to (optionally) select the desired course of action.

Actual language configuration is effected through one or more Language Drivers 240 which, in turn, selects the most appropriate language configuration tables (from translation resource files 245) and most appropriate character set(s) (from code pages 247). As shown in particular detail, each driver 241 of the language drivers is of a particular type (identified with an LDID value) and references an appropriate resource file and an appropriate character set or code page (including primary and secondary code pages). These components of the system 200 will now be described in greater detail.

1. Code Pages

No one character set suffices for all data objects. For instance, many European languages require more letters than the standard 26 characters (A to Z) provided by English. One approach to supporting additional letters is to store them in the "extended" part of a computer's character set. In the IBM-standard PC character set, the "extended" portion occupies character values from the numbers 128 through 255. Thus, these extended characters (for simplification, referred to herein as the "extended ASCII" characters) may be used for foreign language characters (such as an umlauted "a"), as well as for other characters (e.g., box-drawing or other special symbols).

Different collections of these character mappings are arranged into separate character sets. Also referred to as a "code page," "character repertoire," or "character glyph mapping," a character set provides a table for relating the binary character codes (including both single and multi-byte ones) used by a program to keys on a keyboard or to the appearance of characters on a display. (For simplicity of description, the foregoing terms will be used interchangeably.) Each code page is assigned an agreed-upon identifier, such as a number (e.g., 437). The computer's operating system and its hardware (computer, keyboard, console, printer) are configured to operate properly with certain code pages. In order for all these pieces of equipment to function correctly, each needs to use the same code page (at a given instance of time). Otherwise, a user might press a key (keyboard device) and see a different character on the screen (display device), or print information from the screen only to see different characters printed on paper.

Under MS-DOS 5.0 (available from Microsoft Corp. of Redmond, Wash.), the following three countries use code page 437 as their default code page:

| COUNTRY | PRIMARY CODE PAGE | SECONDARY CODE PAGE |
| --- | --- | --- |
| International | 437 | 850 |
| English (U.K.) | 437 | 850 |
| English (U.S.) | 437 | 850 |

The following countries use code page 850 as their default code page under DOS 5.0. (In previous versions of DOS, all these countries used a different code page as their default.)

| COUNTRY | PRIMARY CODE PAGE | SECONDARY CODE PAGE |
| --- | --- | --- |
| Belgium | 850 | 437 |
| Brazil | 850 | 437 |
| Denmark | 850 | 865 |
| Finland | 850 | 437 |
| France | 850 | 437 |
| Germany | 850 | 437 |
| Italy | 850 | 437 |
| Latin America | 850 | 437 |
| Netherlands | 850 | 437 |

-continued

| COUNTRY | PRIMARY CODE PAGE | SECONDARY CODE PAGE |
|---|---|---|
| Norway | 850 | 865 |
| Portugal | 850 | 860 |
| Spain | 850 | 437 |
| Sweden | 850 | 437 |
| Switzerland | 850 | 437 |

The following countries do not use code page 437 or code page 850 as their primary code page with DOS 5.0. They do, however, all use 850 as their secondary code page.

| COUNTRY | PRIMARY CODE PAGE | SECONDARY CODE PAGE |
|---|---|---|
| Canadian-French | 863 | 850 |
| Czechoslovakia | 852 | 850 |
| Hungary | 852 | 850 |
| Poland | 852 | 850 |
| Yugoslavia | 852 | 850 |

Switching code pages in DOS does not automatically create the correct language tables inside application software, nor does it act to switch or otherwise update data files and other data objects. Moreover, when extended ASCII characters are used, messages which make sense under one code page may not be readable under another code page. In application software, for instance, switching a code page does not change the messages displayed by the program. Instead, special characters used by one code page are typically mapped into some appropriate alternate character drawn from the new code page. Using code page 850, for example, the character code 229 represents the character "õ". When read under code page 437, however, the very same code will instead be considered a Greek sigma (σ) character and will not be allowed to function as an alphabetic character. Thus in a database application, the character cannot be used to name objects, will not be properly handled by character functions (e.g., dBASE LOWER( ) function), and will not be included in the sort order (except as a graphic symbol).

In addition to the foregoing problem, there are numerous other problems with operating application software with an incorrect code page (i.e., one having alphabetic tables that do not match the current OS code page). Users can, for example, enter characters that the application software will not be able to handle properly. In such an instance, the application may consider the characters as invalid alphabetic characters. As a result, the application may not calculate character/text string operations (e.g., UPPER( ) or LOWER( )) correctly. Moreover, the system may not know how to arrange these characters in alphabetical order. Existing database files, indexes, forms, reports, and labels may appear and behave differently, even in an unpredictable fashion, depending on how they were designed.

Sharing a common code page is no guarantee of compatibility either. Users from different countries may have different language tables stored in language resource files of the application. Consider, for example, users in France, Germany, and Italy all using code page 850, yet employing different language tables; in such an instance, ordered lists show different results. As another example, applications often convert names of files, fields, memory variables, and the like to corresponding uppercase versions when working with and storing them; in such an instance, case is not a factor. If users include extended ASCII characters in such names, since the uppercasing rules differ from country to country, two distinct names in one country may be seen as the same name in another country. As a final example, in France, "fred" and "fréd" (i.e., "fr"+CHR(130)+"d") may be seen by programs (e.g., dBASE) as "FRED". In Italy, however, "fred" is seen as "FRED", while "fréd" is seen as "FRÉD" (i.e., "FR"+CHR(144)+"D"); in the US, the "é" character would be treated as non-alphabetic, with the result that "fréd" would not be able to function as an identifier. All told, code page compatibility is but one of many considerations.

B. Resources: Language Configuration Tables

System 200 includes one or more translation resource (.RES) files. Within each resource file are appropriate language configuration tables and a complete set of messages for the target code page and translation. During system set up, these files serve to configure the system to match the user's primary or secondary code page, as defined by operating system (e.g., DOS 5.0).

Each resource file includes an identifier for the code page and locale for which it is intended. For a system employing code pages 437 and 850 as primary and secondary code pages, for example, one resource file will include an identifier for 437 and another will include one for 850. In this manner, a development group (particularly one charged with translating) can easily decide what messages to include in each source file. In the U.S., for example, messages written for code page 437 work fine under code page 850. In other countries, however, messages written for one code page might not make sense under another code page. In such an instance, the resource file may contain a different version of the messages.

In an exemplary embodiment (using the specific example of a DBMS embodiment), a translation resource file contains the following set of tables: several alphabetic tables, a box-drawing (optional) table, and a SOUNDEX (optional) table. Each will now be described in turn.

Alphabetic tables provide five basic tasks:
(1) Determining if a character is alphabetic. This information is helpful, for example, for functions which operate on alphabetic data (e.g., ISALPHA( ), ISUPPER( ), ISLOWER( ), the "A" picture format function, alphabetic picture template symbols, and the like found in dBASE).
(2) Mapping a lowercase character into its uppercase equivalent (and vice versa). Functions which require this information include, for instance, dBASE UPPER( ), LOWER( ), the "!" picture function, as well as some picture template symbols.
(3) Ordering of alphabetic characters. This is needed to SORT and INDEX data, for example, as well as for string comparisons.
(4) Ordering of two-letter combinations. In Spanish, for instance, the two-letter combination of "ch" is ordered after other two-letter combinations with "c" (i.e., "cz"<"ch"<"d"). This information is stored in a "two-to-one table" (i.e., multi-letter combinations which "collapse" for purposes of ordering).
(5) Ordering symbols that can be expanded to two letters. In German, for instance, the character β (char code 225 in code pages 437 and 850; char code 223 on Windows ANSI/Latin-1) is appropriately treated as "ss" (i.e., a pair of lowercase "s" characters) when sorting. This information is stored in a "one-to-two table" (i.e., single letters which "expand" for purposes of ordering).

The other exemplary resources include box-drawing table and SOUNDEX tables. The former tells the system which characters to use for drawing boxes and lines (e.g., for user interface). The latter tells the system what SOUNDEX values to assign to extended ASCII characters; this information is useful, for instance, for dBASE SOUNDEX( ) and DIFFERENCE( ) functions. By default, these tables are always used.

C. Default configuration: LANGTABLES Setting

In an exemplary embodiment, the system includes a configuration or preference file 231 (dBASE CONFIG.DB file) where users may specify system settings or "preferences." To tell the system to use the alphabetic tables, the following setting is entered in the configuration file: LANGTABLES=ON. Conversely, LANGTABLES=OFF will tell the system to employ a default (e.g., employing US tables). During system operation, users are alerted whenever they employ a data object (e.g., file or index) created under one setting of the language table (LANGTABLES), while the system is operating under another setting of the language table. In this manner, the LANGTABLES setting provides a quick method for switching to a default language resource.

By defaulting to a particular setting (e.g., US), the system is always able to provide a lowest common denominator (i.e., the ability to default to a common set of data). The advantage of this approach may be seen, for instance, in a single version intended for two separate markets: the United States and the United Kingdom. For the US/UK version, the LDID stored in the resource file is preferably set to the UK language driver ID. The US language driver ID (27) is not inserted into the resource file but, instead, is indicated by a LANGTABLES OFF flag. In other words, with language tables off the US LDID is inserted into data objects which are created or modified, just as if the US LDID had been stored as a default in the resource file; the stored LDID is ignored. Moreover, the system does not rewrite the stored LDID kept in the resource file but merely overrules its value, by setting the active LDID to the value of 27 during each session of the system in which language tables is set to off. The operation of assigning the active LDID (which in the case of language tables being off is the value of 27) may be summarized by the following table.

| LANGTABLES | Stored LDID | Active LDID | Local LDID Value |
|---|---|---|---|
| ON | <stored LDID> | <stored LDID> | <stored LDID> |
| OFF | <stored LDID> | <default LDID> | <default LDID> | where, for example, the default LDID is US (i.e., 27).

During a session of the system with language tables off, when a database file or index with a local ID of 27 is encountered, there is no language driver mismatch; both the active version of the system and the file or index have matching LDID values of 27. When a session of the system with language tables enabled encounters a database file or index with a local LDID of 27, there is a language driver mismatch (since it is not possible for the session to have an active LDID of 27 and also to have language tables on).

D. Language Drivers

1. Introduction

"Language drivers" are provided to correctly handle characteristics of a given language. The drivers reference a character set and a collection of tables describing the rules for that character set. For instance, language drivers include information about character sets (code pages), sorting orders, upper case and lower case rules, which characters are alphabetic, and what double-letter combination it is to accept. While the language driver for two countries may actually use the same code page, they are not necessarily the same. For instance, French, German, and Italian may all use code page 850 (or 437), yet employ different alphabetic tables, since their sorting orders differ. Language drivers are supported with language customization tables (described above) and must be used with the correct code page (from the operating system).

For those readers who may be unfamiliar with the intricacies of translating information from one language to another, the following will serve as an example. Characters that are alphabetic in one code page XXX (e.g., 850) may not be alphabetic in another code page YYY (e.g., 437). Thus, a user trying to employ an index created under XXX, while running under YYY, may see what looks like graphic characters in the sorted list. Conversely, if the user creates a new index under YYY, the odd looking graphic characters end up (are sorted to) the end of the collation list, as they are not considered alphabetic characters by code page YYY.

This can cause information records to be lost, particularly if the user is employing a filter which is limited to a range of character values (e.g., dBASE SET FILTER TO command). For instance, under code page 850, character code 229 plus "laf" falls within a range of records from greater or equal to "O" and less than or equal to "P" (e.g., dBASE command SET KEY TO RANGE "O", "P"). Under code page 437, however, it would no longer be in this range, since it would be near the bottom of the ordered list. Moreover, as users may include extended-ASCII characters in the names of fields, files, memory variables, menus, pop-ups, and the like, if these characters are no longer valid in another code page, the program will no longer function when a different code page is employed. For instance, a field name of character code 229 plus "laf" works fine under code page 850; however, if this field is used in a key expression, then when a 437 code page user attempts to load the database file, the system will complain of an illegal key expression (with a failure to open the database file).

2. Language Driver Identifier (LDID)

The present invention introduces the concept of a language descriptor embedded within objects which may be language dependent. In a preferred embodiment, the descriptor contains sufficient information to convey locale information for an object. Alternatively, particularly for those embodiments having data objects constrained by downward compatibility or storage space considerations, the descriptor is a Language Driver Identifier (LDID) of the present invention. The LDID may be embodied in the form of a system-comparable unit, such as an ID byte which references an agreed-upon set of values (e.g., locale lookup table).

For purposes of clarity, the discussion which follows will focus on use of the LDID descriptor embodied as a byte identifier. Those skilled in the art will appreciate that a descriptor or identifier of the present invention may be embodied in other forms, such as a multi-byte identifier, a text string, or even as a variable-length data member (e.g., identifier data record having a record header and body). Regardless of its particular form, however, the descriptor need only be capable of being stored in desired locations to convey information about the language driver that was in use when data objects were created or modified.

The LDID of the present invention allows the system to intelligently process data objects created or modified under one language driver with those created or modified by a different language driver. In the event of incompatibilities, the system provides error handling routines, including facilities for warning users of incompatible or otherwise illegal operations.

In the simpliest design, there is a one-to-one correspondence between a language driver and its LDID. For example, the language driver for the United States (DB437US) may be identified with an LDID tag of 27. In a more complex embodiment, it may be desirable to include subtypes and/or some redundancy. In a preferred embodiment, LDIDs may be defined for locales (having available language drivers) as shown by the following header file (excerpt):

```
//
// UNIQUE LANGUAGE DRIVER ID
//
// Paradox
#define pxUS             1      // cp437
#define pxINTL           2      // cp437
#define pxJAPANESE       3      // Shift-JIS
#define pxNORDAN         4      // cp865
#define pxNORDAN4        5      // cp865
#define pxSWEDFIN        6      // cp437
// dBASE
#define dbARABIC         7      //
#define dbDANISH         8      // cp865
#define dbDUTCH          9      // cp437
#define dbDUTCH2        10      // cp850
#define dbFINNISH       11      // cp437
#define dbFINNISH2      12      // cp850
#define dbFRENCH        13      // cp437
#define dbFRENCH2       14      // cp850
#define dbGERMAN        15      // cp437
#define dbGERMAN2       16      // cp850
#define dbITALIAN       17      // cp437
#define dbITALIAN2      18      // cp850
#define dbJAPANESE      19      // Shift-JIS
#define dbSPANISH2      20      // cp850
#define dbSWEDISH       21      // cp437
#define dbSWEDISH2      22      // cp850
#define dbNORWEGIAN     23      // cp865
#define dbSPANISH       24      // cp437
#define dbUK            25      // cp437
#define dbUK2           26      // cp850
#define dbUS            27      // cp437
#define dbFRENCHCAN     28      // cp437
#define dbFRENCHCAN2    29      // cp850
#define dbFRENCHCAN3    30      // cp863
#define dbCZECH         31      // cp852
#define dbCZECH2        32      // cp867
#define dbGREEK         33      // cp437 (Modified)
#define dbHUNGARIAN     34      // cp852
#define dbPOLISH        35      // cp852
#define dbPORTUGUESE    36      // cp860
#define dbPORTUGUESE2   37      // cp850
#define dbRUSSIAN       38      // cp866
// Borland
#define BorlDANISH      39      // Latin-1 (ANSI/Windows)
#define BorlDUTCH       40      // Latin-1 (ANSI/Windows)
#define BorlFINNISH     41      // Latin-1 (ANSI/Windows)
#define BorlFRENCH      42      // Latin-1 (ANSI/Windows)
#define BorlCANADIAN    43      // Latin-1 (ANSI/Windows)
#define BorlGERMAN      44      // Latin-1 (ANSI/Windows)
#define BorlICELANDIC   45      // Latin-1 (ANSI/Windows)
#define BorlITALIAN     46      // Latin-1 (ANSI/Windows)
#define BorlJAPANESE    47      // Latin-1 (ANSI/Windows)
#define BorlNORWEGIAN   48      // Latin-1 (ANSI/Windows)
#define BorlSPANISH     49      // Latin-1 (ANSI/Windows)
#define BorlSPANISH2    50      // Latin-1 (ANSI/Windows)
#define BorlSWEDISH     51      // Latin-1 (ANSI/Windows)
#define BorlUK          52      // Latin-1 (ANSI/Windows)
#define BorlUS          53      // Latin-1 (ANSI/Windows)
#define BorlPORTUGUESE  54      // Latin-1 (ANSI/Windows)
#define dbUS2           55      // cp850
#define BorlINTL        56      // Latin-1 (ANSI/Windows)
// Paradox
#define pxINTL2         57      // cp850
#define pxSPANISH       58      // cp437
#define pxICELAND       59      // cp861
// Paradox WIN
#define pxwINTL         60      // Latin-1 (ANSI/Windows)
#define pxwINTL2        61      // Latin-1 (ANSI/Windows)
#define pxwSPANISH      62      // Latin-1 (ANSI/Windows)
#define pxwSWEDFIN      63      // Latin-1 (ANSI/Windows)
#define pxwNORDAN4      64      // Latin-1 (ANSI/Windows)
// dBASE
#define dbNORWEGIAN2    65      // cp850
#define dbDANISH2       66      // cp850
#define dbICELANDIC     67      // cp861
#define dbICELANDIC2    68      // cp850
#define dbTURKISH       69      // cp853
// ROE 100–120
#define pxCZECH        100
#define pxCZECH2       101
#define pxPOLISH       102
#define pxRUSSIAN      103
#define pxHUNGARIAN    104
#define pxGREEK        105
#define pxGREEK2       106
#define pxHEBREW       107
#define pxARABIC       108
#define pxSLOVENE      109
#define pxTURK         110
#define pxTURK2        111
#define pxTURK3        112
#define pxBULGARIAN    113
#define pxFARSI        114
#define pxROMANIAN     115
#define pxwARABIC      116
#define pxwHEBREW      117
#define pxHEBREW2      118
#define pxwHEBREW2     119
```

As shown, a locale may be identified with variations, such as Turk, Turk2, and Turk3. Such variations or subtypes may be needed because a given locale may use different code pages or use different sort orders (e.g., dictionary sort versus ASCII sort). There is no requirement that the identifier information be of a particular format. The information may be, for instance, embedded as a text string within a data record or the like.

The preferred embodiment of the local LDID in the header section of a data file is illustrated in FIG. 2C. As shown (e.g., for a dBASE .DBF file), the Identifier may be positioned at a known location(s) in the file (e.g., byte offset 29 for the .DBF file). The Identifier, in turn, references a lookup table which identifies the appropriate language driver for the file.

3. Uses of LDID

Each installed version of the system 200 includes a preferred or default Identifier (e.g., ID byte), such as may be stored in the above-described resource file (e.g., DBASE1.RES of dBASE). The Identifier, which is referred, to as the "stored Language Driver ID" ("stored LDID"), specifies the language driver for which that version of system has been configured. In this manner, it may be distinguished from and compared to corresponding identifiers embedded within data objects themselves.

When a session of the system is initiated (i.e., user instructs system to load and begin operation), the stored LDID is read from the resource file. Its value is assigned to the "active Language Driver ID" for that session of the system. The user may override the active Language Driver ID (e.g., by setting LANGTABLES to OFF), whereupon the stored LDID value is overridden with a special value of 27.

The active LDID, in turn, is written to data objects which the system "touches" (i.e., creates or modifies). Again using the present example of dBASE DBMS embodiment, the system writes an LDID byte into the following database data objects:

| File Type | File Extension | Location |
|---|---|---|
| Data table | .DBF | 0 × 1D |
| Single index | .NDX | 0 × 0B |
| Multiple index | .MDX | 0 × 1F in header |
| | | (0 × 0B in each tag header) |

In this fashion, the byte identifier indicates the exact language driver which was employed when the file (or tag) was created or modified. To distinguish it from the "stored Language Driver ID" ("stored LDID"), this locally stored identifier is referred to as the "Local Language Driver ID" or "Local LDID" 215.

In a preferred embodiment, the system provides for downward compatibility for systems which may not be language driver aware. In particular, a user-settable command (e.g., dBASE-style SET command) is provided for disabling LDID checking. The default is for SET LDCHECK to be set to ON. To disable the check, SET LDCHECK to be set to OFF. The command may be issued at startup (e.g., in CONFIG.DB of dBASE); alternatively, the command may be specified as an argument to the system (e.g, a dBASE SET command).

In a preferred interface of the system, the current state of checking is displayable to the user and managed through use of an internal flag (zero__ldid__msg). Each development group charged with translation may set this flag in the resource file to tell the system whether to show error messages when users load files that have a local LDID which is not set (e.g., is set to zero). When the flag's value is 0, for instance, no message is displayed when a data object (e.g., database file or index file) has a local ID of zero. When the value is 1, however, instances of a local ID of 0 is identified for the user. Operation of the internal flag (zero__ldid__msg) is described in further detail hereinbelow. Whether or not the warning message appears, the local LDID of zero is preferably updated (replaced by the active LDID).

Exemplary Uses for Language Configuration

The following describes exemplary uses of the tools described in the previous section for managing language configuration tasks. Again for purposes of illustration and not limitation, the description will focus on techniques operative in a database management system embodiment.

A. Install: Configure resource file

In an exemplary embodiment, application software is "installed" on the system by INSTALL, which itself is a program. In addition to configuring a system towards general preferences of a user, installation may be employed for configuring an application for the user's choice of a default code page.

The default language driver for the system may be established by one of several ways. The system may allow the user to select a preferred locale from a list of available drivers, with a default selection provided. Alternatively, the country configuration of the current operating system may be determined (e.g., from looking at the active code page, or from calling MS-DOS Get/set country information services), with a language driver. appropriate for the country being automatically selected. If an appropriate driver is not available, the user is warned.

B. Checking for Correct Code Page
1. Reconciling Application and OS Code Pages

It is possible, on occasion, that upon execution of an application, the code page for the application (as specified in the application's resource file) does not correspond to the code page for the operating system. Thus, in a preferred embodiment, it is desirable to detect such instances and notify the user (e.g., with the error message, "System is not configured for current code page"). It is also desirable to detect instances where users have switched to an alternate code page for their country. If a user in the United States has, for example, switched to code page 850, the situation should be detected and (optionally) reported. When the active code page does not match that of the application, therefore, a user may be given the option of changing the code page of the OS to match that of the application or, alternatively, change the code page of the application (e.g., through an "install" or "config" utility) to match that of the active OS code page.

2. Loading Application and Active LDID

When an application is loaded (from mass storage into the system memory for execution by the processor), the application first checks the LANGTABLES setting, if LANGTABLES is off, the application sets the active LDID to the default value (e.g., a value of 27). Otherwise, the program sets the active LDID for the current session to the value of the stored LDID in the resource file. Employing the above-described zero__ldid__msg flag, the application when loaded may also check a status flag (byte) in the resource file for determining whether to suppress error messages when a user opens files with a local LDID of zero.

C. Example: Opening Database Files

Figure 3A:
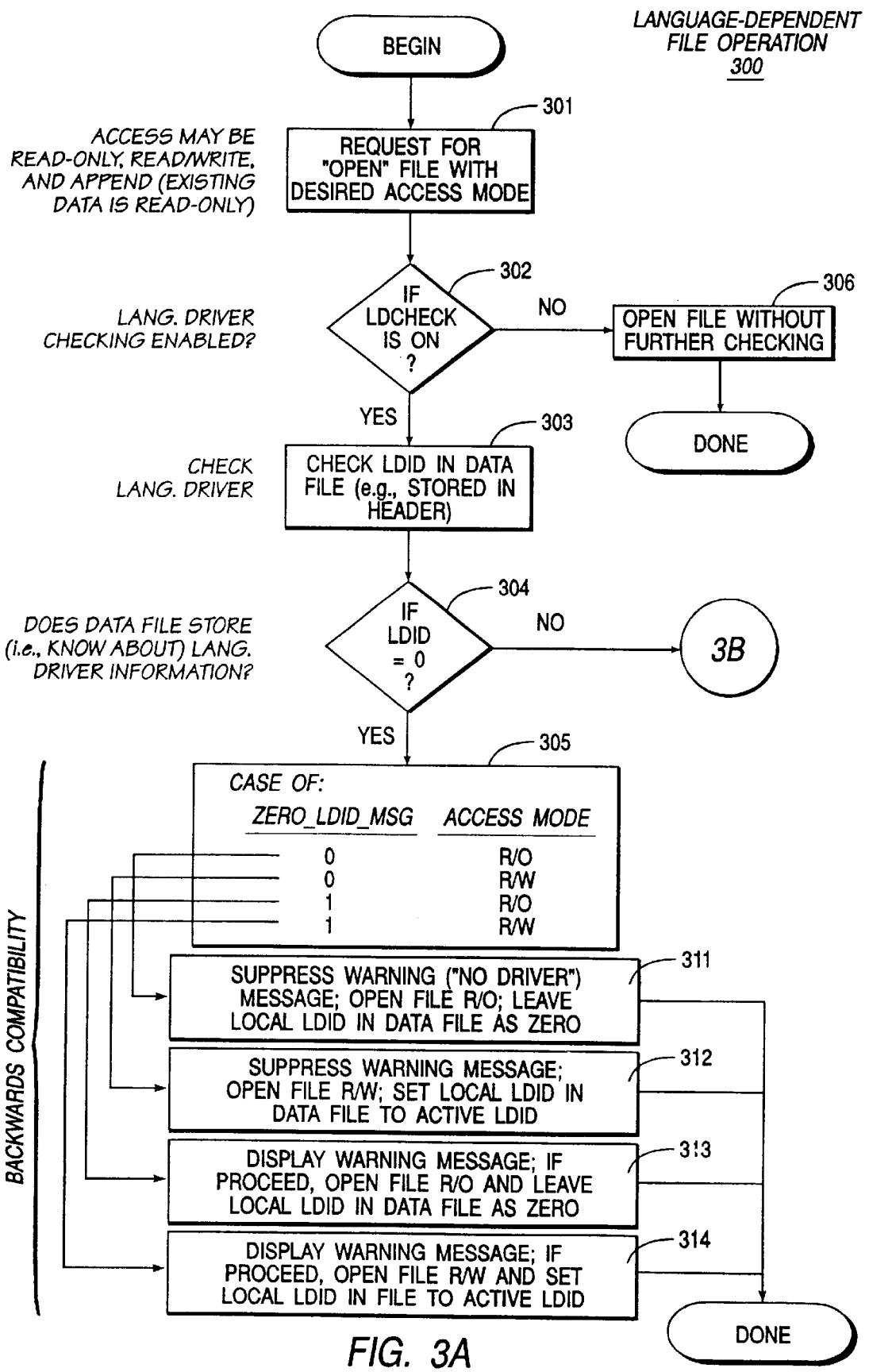
FIGS. 3A–B comprise a flowchart illustrating a language-dependent file operation method of the present invention.
Figure 3B:
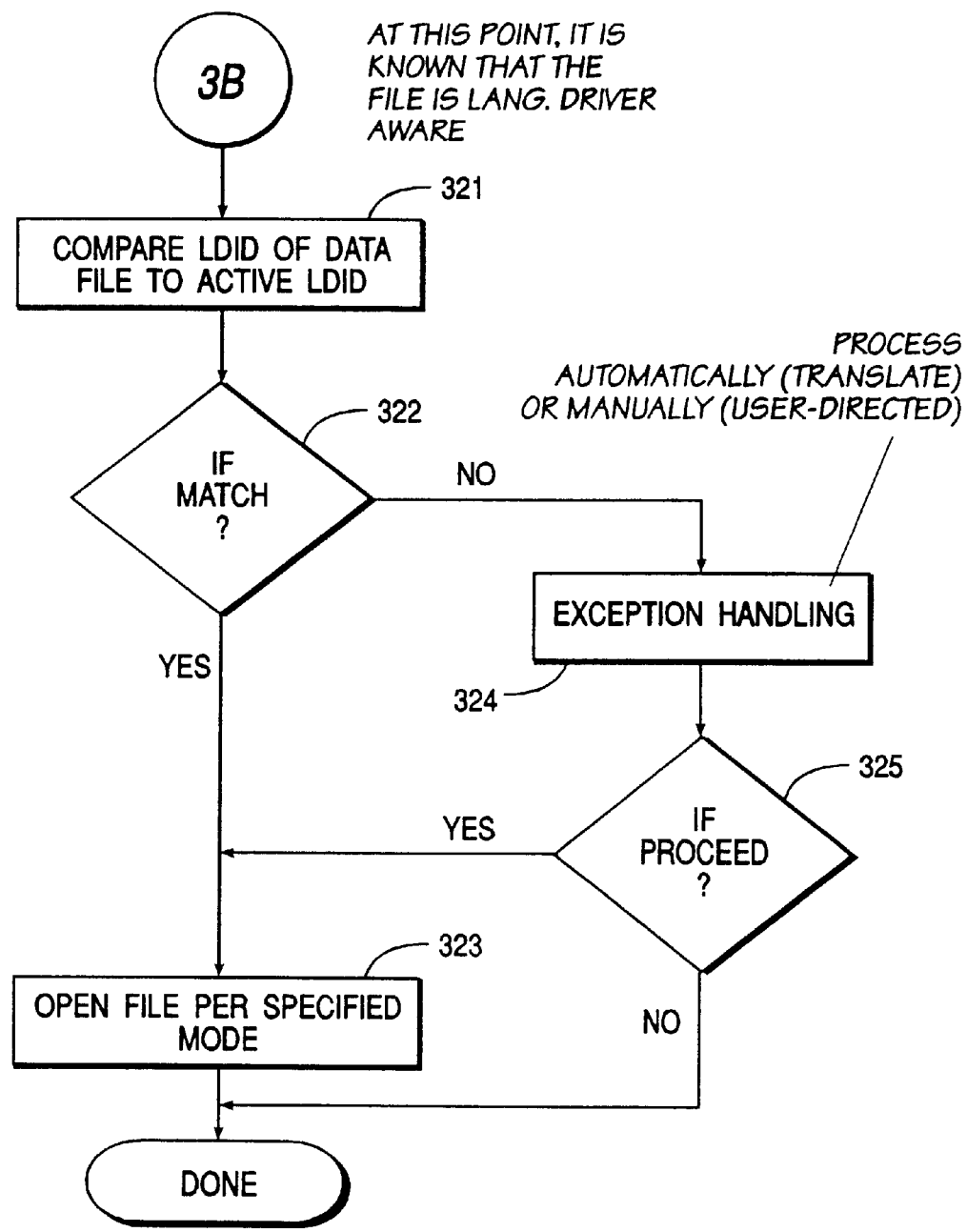

The following example will illustrate application of the principles of the present invention for the operation of opening a file, such as a database file. Referring now to FIGS. 3A–B, a preferred method 300 of the present invention for processing a request to open a file in a system having National Language Support includes the following steps. At step 301, a request is received by the system for opening a file. For example, in the instance of a database application, an open or use (e.g., dBASE USE) command may be issued for opening an existing database file. As is known in the art, a request to open or otherwise obtain a handle to a disk file is typically done in conjunction with a particular access mode, that is, a file can be opened in different ways. For instance, a file may be opened for "read-only" access. In the instance where one needs to both read to and write from a file, a "read/write" access mode or type is appropriate. As still yet another type of access, one may need to only append information to an existing file (i.e., write new information to the terminal portion of that file); "append" access may be treated as if the existing data is read-only. Access mode is important as it determines the ability of the system to touch (create/modify) the data object.

After receiving a request to open a file in step 301, the method proceeds to step 302 to determine whether language-driver checking is enabled. If language-driver checking has not been enabled (no at step 302), then the method proceeds to step 306 to open the data file in a normal fashion (i.e., without further checking), using the specified access mode. If, on the other hand, checking has been enabled (yes at step 302), then at step 303 the language driver identifier (LDID) in the data file is read. In a preferred embodiment, the identifier will be stored in the data file at a position where it may be conveniently accessed upon first reading the file. The identifier may be stored, for instance, within a header of the data file. Those skilled in the art will appreciate, however, that the identifier may be positioned at a different location or locations within the data file. In the instance of a data file comprising a plurality of data regions (either logically or physically discrete), the language driver identifier may be stored within any organizable unit of data where language configuration is important, including within selected records or fields (individually or by group) and the like. Alternatively, the identifier may be stored in a footer to the file but in such a case should preferably be read before processing other information contained within that file is undertaken.

At step 304, an optional step is added to maintain backwards compatibility (such as for data files created by systems (typically, older ones) which do not know about language driver information. If meaningful information is not stored by the LDID (e.g., LDID=NULL), then the method proceeds to step 305 for special processing of what is determined to be an non-language aware (older) data object.

At step 305, one of four paths may be pursued. In the case that the warning ("no driver") message has been disabled (zero_ldid_msg=0), and the specified access mode is read-only, then the method proceeds to step 311 to suppress any warning message, complete the file open operation as read-only access, and leave the local LDID (i.e., the ones stored in the data file) as zero. In the case of the message being suppressed and the specified access mode is read/write, the method proceeds to step 312 to suppress any warning message, continue to open the file with read/write access, and set the local LDID to the value of the active LDID (thus updating the file for language configuration).

Figure 4A:
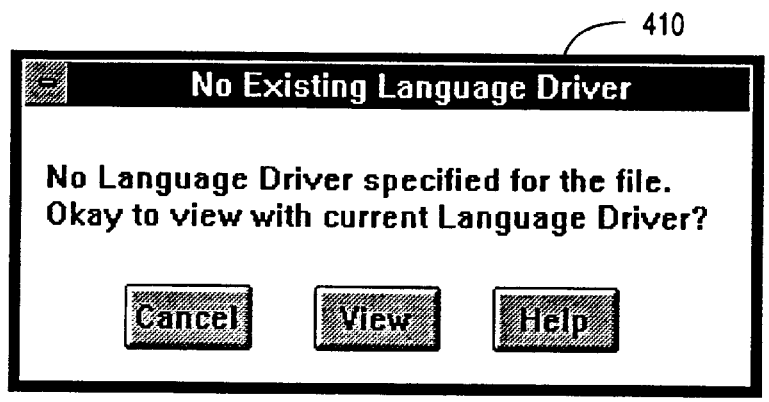
FIGS. 4A–C are bitmap illustrations of exemplary dialog interfaces for reporting language driver information and receiving user choices in response thereof.
Figure 4B:
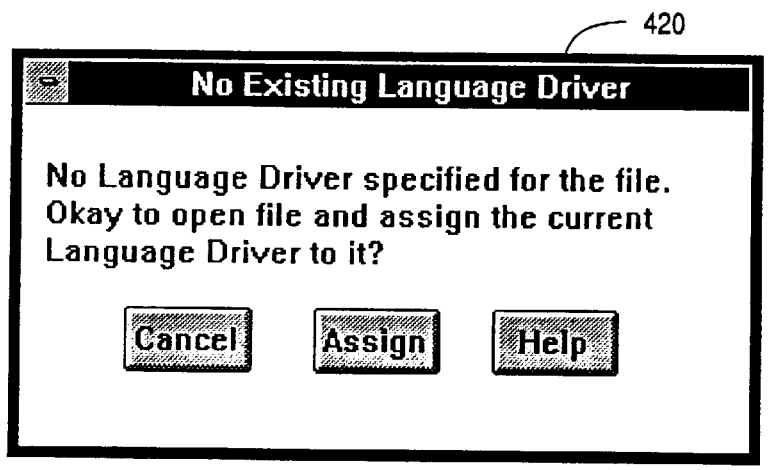

The remaining two case arms of step 305 proceed as follows. In the case of the warning message being enabled (zero_ldid_msg=1) and read-only access, the method proceeds to step 313 to display a warning message for the data file. As shown by FIG. 4A, for example, a dialog box 410 may be displayed on the screen device for conveying this information and asking the user whether to proceed with viewing (i.e., read-only access) the file employing the current language driver (i.e., the one specified by the active LDID). Thus as shown by the dialog box 410, the user may elect to proceed at this point or cancel the operation (whereupon the file is not opened). If, on the other hand, the warning message is enabled (zero_ldid_msg=1) and the specified access mode is read/write, then the method proceeds to step 314 to display a warning message, such as shown by dialog box 420 of FIG. 4B. As shown, the user is informed that no language driver has been specified for the data file. The user is queried whether he or she wishes to open the file (with read/write access) and assign the current language driver to it (i.e., update the local LDID in the file to the active LDID). These operations may be summarized by the following table:

| zero_ldid_msg | Mode | Action |
|---|---|---|
| 0 | R/O | Do NOT show the R/O no driver message; open file R/O; leave local LDID in .DBF as zero |
| 0 | R/W | do NOT show the R/W no driver message; open file R/W; set local LDID in .DBF to match active LDID |
| 1 | R/O | show the R/O no driver message; if file is used, leave local LDID in .DBF as zero |
| 1 | R/W | show the R/W, no driver message; if file is used, set local LDID in .DBF from active LDID |

Figure 4C:
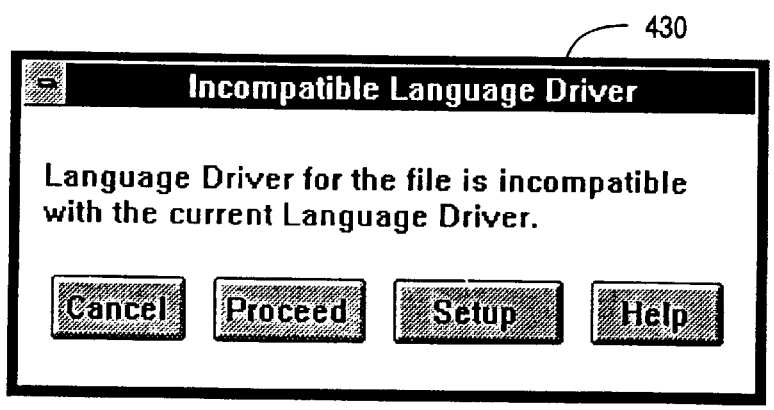

If the LDID identifier is set to a valid value, at step 304, then the method proceeds to step 321. As shown in FIG. 3B, at step 321 the method compares the LDID of the data file (local LDID) to the current or active LDID. If the two are identical or compatible at step 322, then the method may proceed to step 323 to open the file per the specified mode; thus at this step, the method has determined that the system can process the language-dependent data file without error. If, on the other hand, the LDIDs are incompatible (no at step 322), then the method branches to step 324 to handle the exception. At step 324, for instance, the system may automatically translate the data file into a format which is compatible with that currently employed by the system; alternatively, the system may be automatically set to a language driver which is appropriate (compatible) for the data file. If desired, the user may assume some responsibility for the process. As shown by dialog box 430 of FIG. 4C, for example, the user may manually instruct the system to abort or cancel the operation. The user is also given the option to change the existing setup (e.g., setting the system language driver to one which is compatible with that of the data file). Finally, the user may instruct the system to proceed, typically having changed the setup to compatible drivers, or even leaving the drivers as incompatible (e.g., in the instance where the user knows beforehand that the information to be processed within the data file is itself not language dependent). If the system is to proceed (either automatically or manually), then at step 325 the method branches to step 323 to open the file per the specified mode. Otherwise (no at step 325), the method concludes without completing the file open operation.

In the instance of a multi-national organization with distributed database files, it is desirable to ensure that the LDID replacing the zero-stored LDID is the one most useful to the organization as a whole. For example, if the company does ninety percent of its business in France, Germany, and Italy, it would be awkward if the first user of an important pre-existing file (i.e., one having LDID=0) were a sales representative from Poland. Specifically, if the zero-stored LDID is replaced by the Polish LDID, then subsequent multi-national users who attempt to open that file will receive a warning that the language drivers do not match; only Polish users would not get this warning. Moreover, it would be awkward if this same organization let the first user of the file be someone with language drivers disabled (i.e., LANGTABLES set to OFF), if most of the users of the organization have enabled language drivers (LANGTABLES set to ON). In such an instance, most users would see a mismatched message. One approach to the problem is to select the best common denominator—a code page (such as 850) that contains most of the accented characters needed. Each language driver includes not only a code page but also the above-mentioned country-specific tables. Whether a French 850 or an Italian 850 language driver is more appropriate for its data processing needs as a whole would be for the company to decide.

The action which the system undertakes when the local LDID has been previously set (i.e., is not equal to Zero) may be summarized by the following table:

When Local LDID is not Zero

| Active LDID Matches Stored LDID? | Action |
|---|---|
| YES | open file with no message |
| NO | show mismatch message if file is used, do not change; local LDID in .DBF |

D. Example: Interrelated Files

Figure 5A:
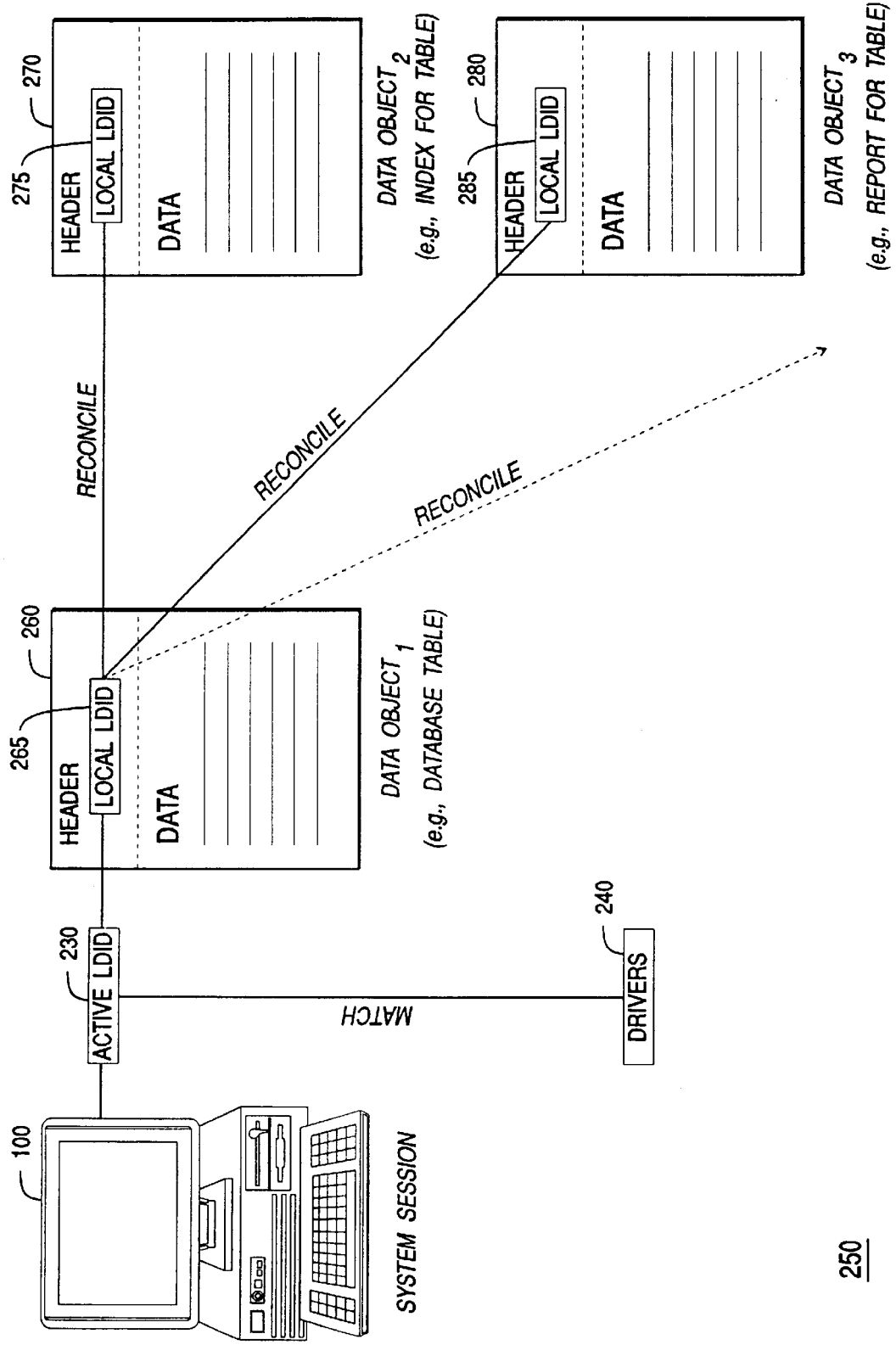
FIGS. 5A–C are block diagrams illustrating the application of language driver identification to more-advanced data objects (e.g., interrelated files).

Referring now to FIGS. 5A–D, application of the principles of the present invention to the management of language configuration for interrelated files will now be described. Often in the use of information or data files, one file will be dependent upon information stored in another. As shown in FIG. 5A, for example, an index file 270 (e.g., dBASE .MDX or .NDX file) must be compatible with its target table file 260 (e.g., dBASE .DBF file). The problem is compounded by additional interrelated data objects, such as a report object 280 for the table 260.

Consider the following problem. When an index file is created under one language driver and then employed under another, for instance, the order of the data in the table as specified by the index file may be erroneous (since the collation tables of the two differ). Other features of the system which depend upon a correct relationship between the two files may also be corrupted. If a user attempts, for instance, to view information in the table with a particular filter condition in place (e.g., SET FILTER TO LASTNAME="SMITH"), the result obtained may not be as expected. Other language-dependent operations (e.g., convert to uppercase, convert to lowercase, Soundex, is alphanumeric character, and the like) may give unexpected results under the active language driver. Finally, under such circumstances the system may not be able to correctly update the index when a record is modified or added to the table, especially in those instances where the index key expression contains special characters. Thus, it is desirable to identify such instances so that they may be correctly handled.

A general approach for dealing with such an instance is as follows. The mismatch between the interdependent files is identified by comparing the LDIDs for each. For instance, database table 260 may store a first Local LDID 265, index file 270 may store a second Local LDID 275, report file 280 may store a third Local LDID 285, and so forth. Before a dependent file is employed, its LDID is checked against that of the data object for which the dependent file is employed. In this manner, incompatibilities between interrelated files may be trapped and processed accordingly.

For many dependent files, such as the index file, the file may be regenerated or rebuilt from a master file (e.g., by rebuilding the index file from the table according to the indexing criteria); thus, the dependent (index) file may be automatically converted into a file which employs a compatible language driver. Alternatively, the system may display manual options for the user to reindex the file, cancel the operation, or the like.

Figure 5B:
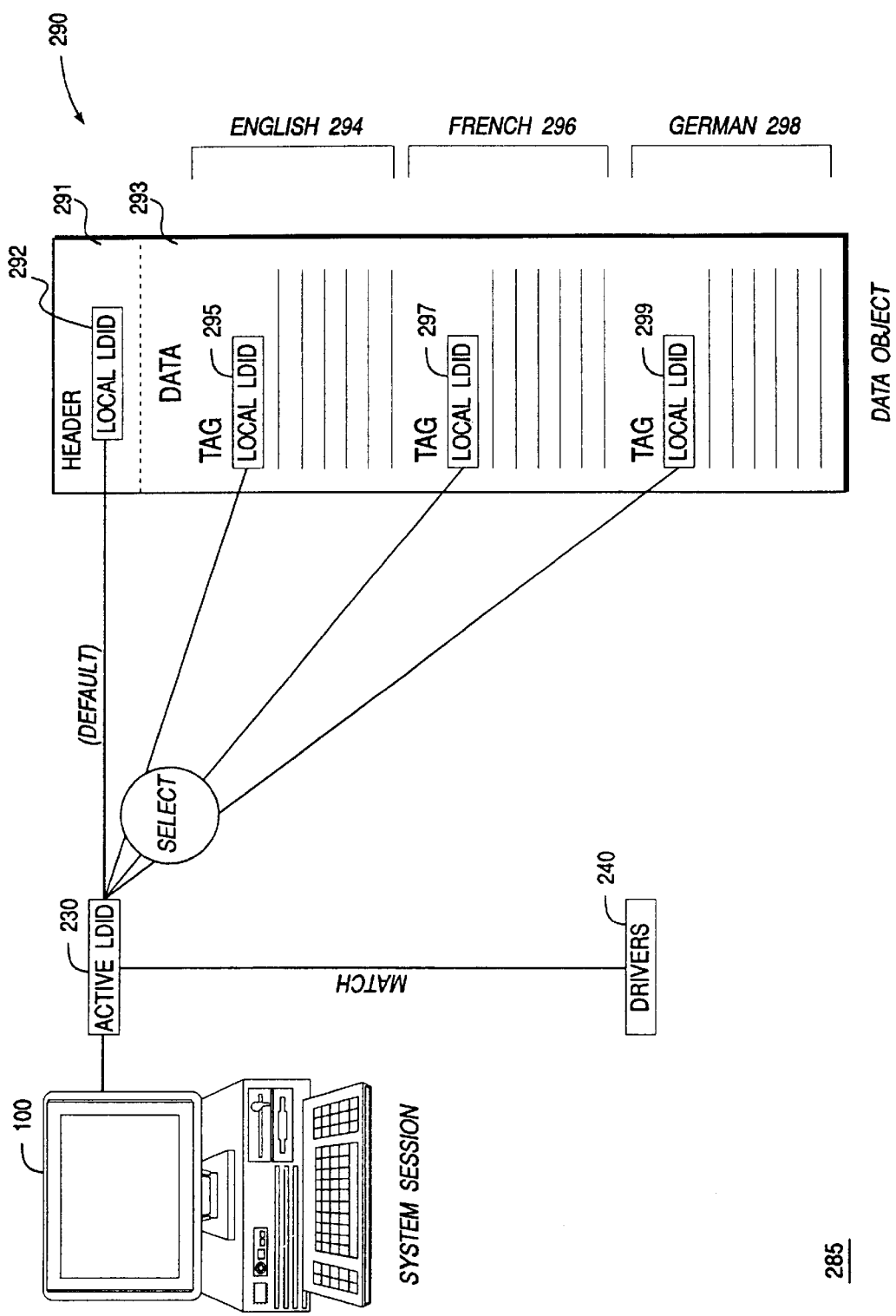

FIG. 5B illustrates the use of separate regions for storing different language-dependent information within a single file. In particular, system 285 includes a multi-region data object 290. As before, the data object includes a header region 291 and a data region 293, with the former storing (optionally) a local LDID 292. The data region 293, in turn, includes multiple logical files or data regions 294, 296, 298, each of which may store language-dependent information. The first data region 294, for instance, may store information created or modified using an English language driver; hence, its local LDID 295 stores an identifier for that particular driver. Similarly, the other regions 296, 298 may store language-dependent information created with other language drivers. Region 296 may store information in French, with its local LDID 297 storeing a reference to the French language driver. Region 298, on the other hand, may store German information, with its local LDID 299 storing a reference to the German language driver. Each region is arranged (e.g., with record tags) so that it may be accessed as a logically separate object. In this manner, the system 100 may select one or more data regions from the object 290 for use with the active language driver of the system (as selected from drivers 240 with the active LDID 230). Moreover, a single file may store multiple copies of the same information, with each copy storing the information under a particular language driver.

Figure 5C:
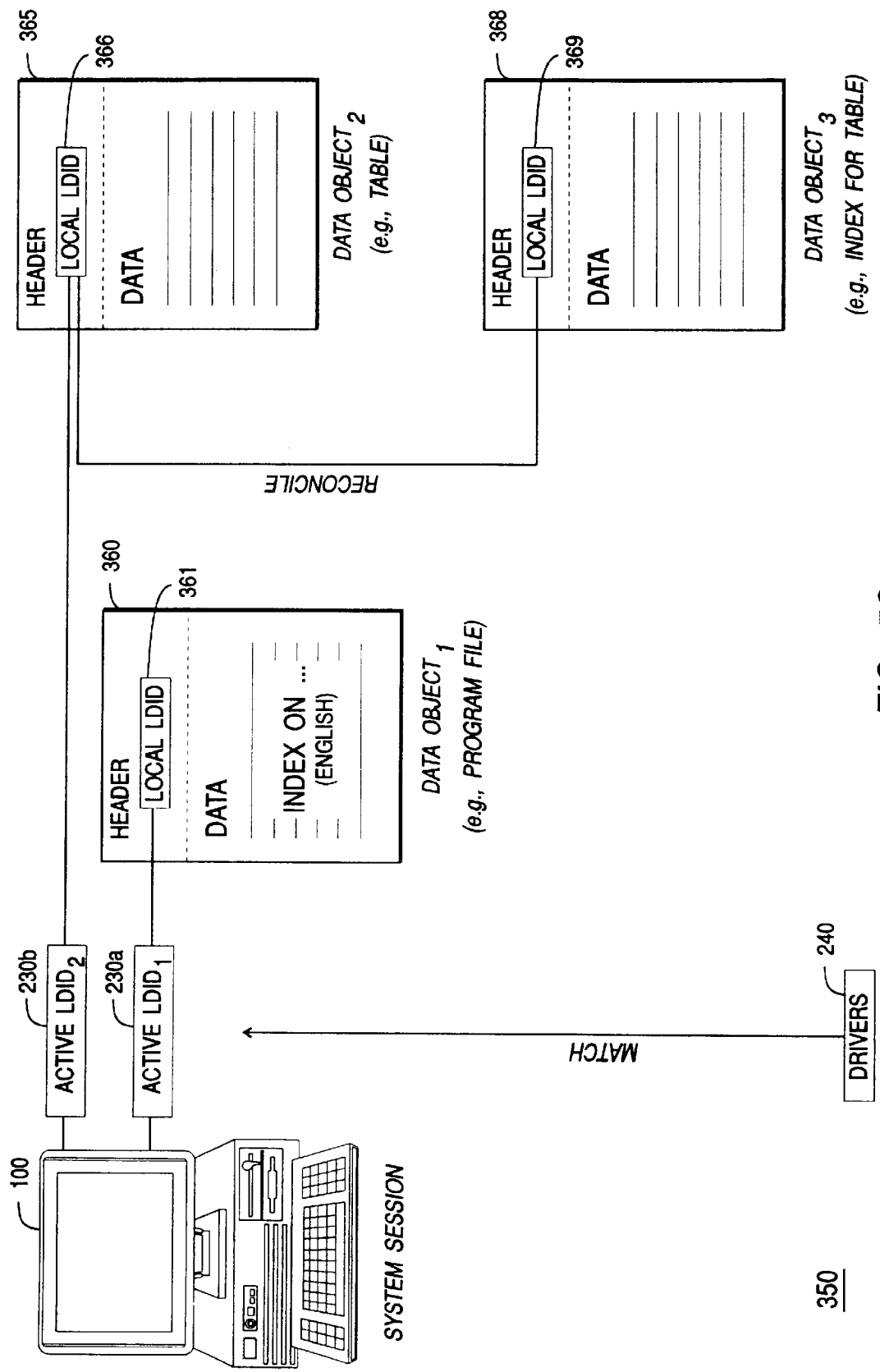
Figure 5D:
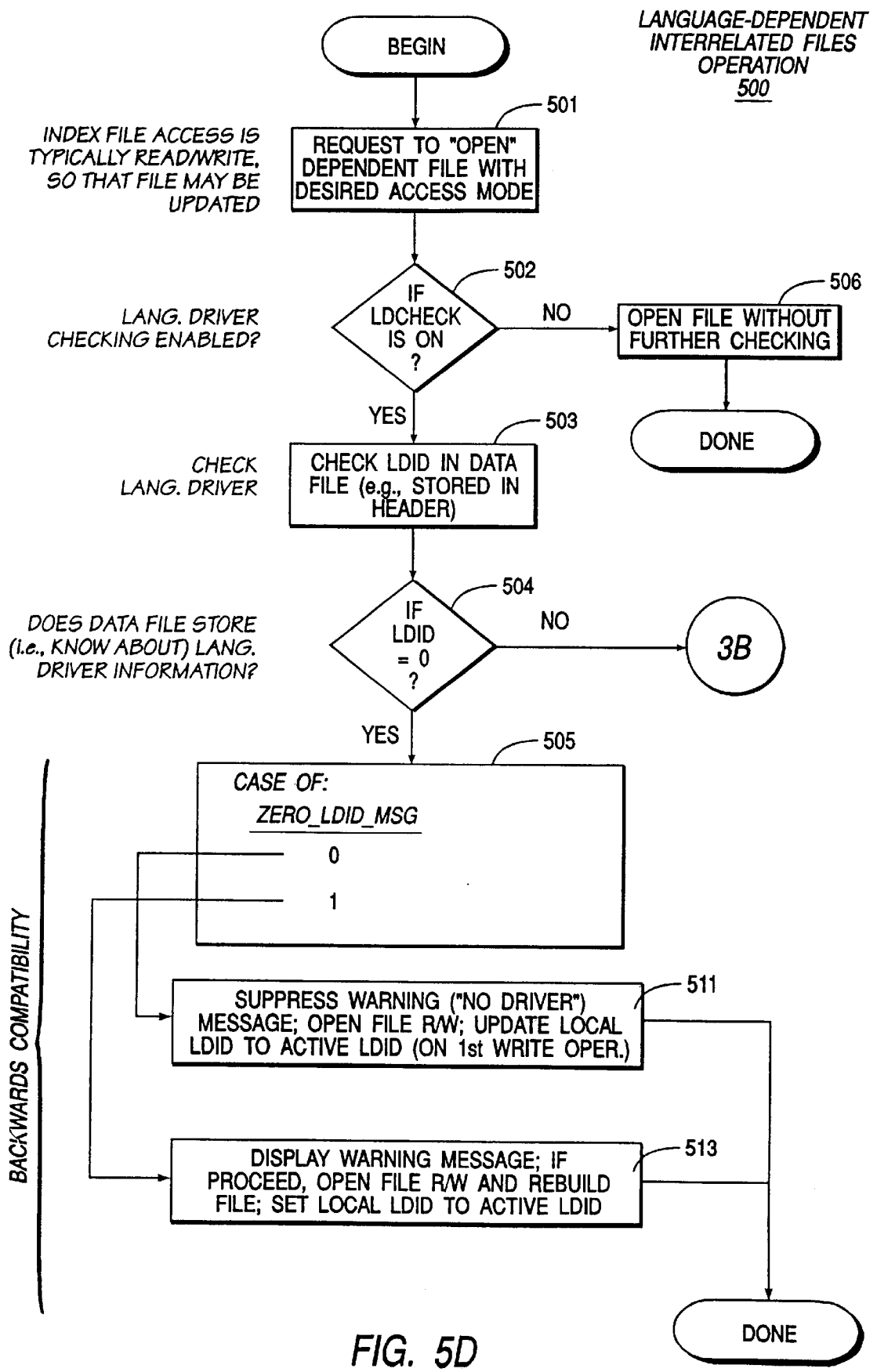
FIG. 5D is a flowchart illustrating a method of the present invention for language-dependent interrelated file operation.

In FIG. 5C, the concurrent use of multiple active language drivers is illustrated. System 350 operates simultaneously on data objects created or modified with different language drivers. For instance, a first data object 360 may be a set of programming instructions (e.g., dBASE .PRG file) which were created under a first language driver (e.g., English). The data object 360 may direct the system 100 to perform some operation on the other data objects. The data object 360 may include, for example, the command to index a table (data object 365) to a particular index file (data object 368). Although the instructions (from object 360) are in a particular language, English in this example, there is no need for the targets of these instructions to also be compatible with that language. Instead, the system 100 need only "understand" (i.e., apply the correct driver to) the data object 360 so that it may carry out the desired operations on data objects 365, 368.

This is achieved as follows. The data object 360 stores a local LDID 361 which is matched to a first active LDID 230a. Data objects 365, 368 (which stored their respective local LDIDs 366, 369) are matched with a second LDID 230b. In this fashion, the system 100 may correctly "talk to" (i.e., process) each data object with its appropriate language driver (selected from drivers 240 with the respective active LDID). Although the system 350 illustrates the simultaneous use of a pair of active LDIDs, those skilled in the art will appreciate that multiple active LDIDs may be employed in the fashion just described to achieve concurrent processing for a multitude of language-dependent data object, each of which may have been created or modified with a different language driver.

Referring now to FIG. SD, a method of the present invention for processing language-dependent interrelated files will now be described. The method 500, which emphasizes operation of system 250, includes the following steps. At step 501, the system receives a request to "open" the dependent file, such as when a user accesses a database file having an associated index file. At step 502, the system determines whether language-driver checking is enabled (e.g., LDCHECK is ON). If checking has been disabled (no at step 502), then the index file is opened without further checking at step 506, and the method concludes. Otherwise (yes at step 502), the method checks the value of the local LDID stored in the index file (e.g., such as stored in the header of an .MDX or .NDX file). At step 504, if the index file is not language-driver aware (LDID=0), then the method proceeds to step 505 for providing backwards compatibility (for indexes created under older systems). At step 505, for the case of LDID message being disabled (zero_ldid_msg= 0), the method proceeds to step 511 to open and use the index file but without a warning ("no driver") message being displayed. Upon the first update (write operation) to the index file, the local LDID is updated to the active LDID. An index file may be written to, for instance, when its key expression is modified, a tag's key expression is modified (in the instance of a multi-tagged index file, such as dBASE.MDX), a new tag is created, a tag is deleted, or the user issues a command to "reindex" the table. In the instance of a multi-tagged index file, the value of the active LDID also replaces the zero value of the LDID in each tag header.

Figure 6A:
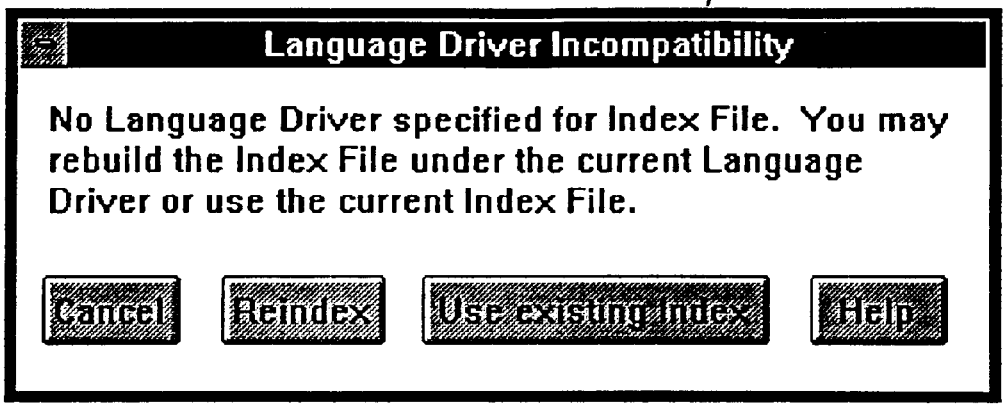
FIGS. 6A–B are bitmap dialog interfaces illustrating the reporting of language driver information (from the method of FIG. 5) and receiving user choices in response thereof.

If, on the other hand, the zero_ldid_msg flag is enabled (indicating that warning messages are desired), then the method proceeds to step 513. At step 513, the system issues a warning to the user that the index file about to be opened does not have an assigned language driver. As shown in FIG. 6A, for example, a dialog box 610 may be displayed with this information. As is also shown, the user is offered options on how the system should proceed. If the user chooses "cancel", the index file is not opened; actual processing of the corresponding table file (without applying the index) may continue if desired. As a second alternative, the user may select a "reindex" option, in which case the index file is reindexed (rebuilt); at this point, the value of the active LDID is written to the local LDID in the index file's header. The value of the active LDID is written to the header of each index tag. In the instance of a multi-index file (.MDX), all the indexes in the file are updated with the active language driver. Any tag header which includes a zero value for the LDID is updated with the value of the active LDID. As a third alternative, the user may instruct the system to use the existing index file. In a preferred method of the present invention, the index file is not reindexed, but nevertheless the value of the active LDID is still written to the local LDID header and tags (as described above). This third option provides flexibility for those users who know that the existing indexes are acceptable and do not wish for the system to take time to regenerate them. The easiest approach is of course to always choose "reindex".

The behavior for local LDID values of zero is summarized in the following table:

When Local Index LDID is Zero

| zero_ldid_msg | Action |
| --- | --- |
| 0 | Do not show "no language driver" message; set local LDID in .MDX or .NDX header to match active LDID; set all local LDIDs in tag headers to match active LDID |
| 1 | Show "no language driver" message; if file used, set local LDID in .MDX or .NDX header to match active LDID, also set all local LDIDs in tagheaders to match active LDID |

If the local LDID is not zero at step 504, then the index file has already been modified by a language-driver aware system. In such a case, the system may compare the local LDID with the active LDID in a manner similar to that set forth in FIG. 3B (steps 321–325 of the method 300). The local LDID and the active LDID are compared (step 321). If the two match (step 322), then the current session of the system is running with the same language driver which was used to create or modify the index file. In such a case, the index file is simply opened and-employed with its corresponding database table file at step 323.

Figure 6B:
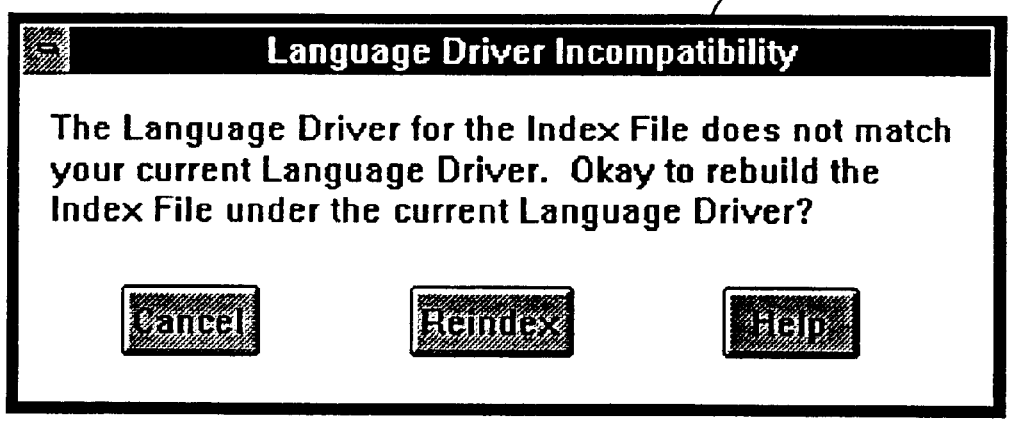

If, on the other hand, the non-zero local LDID is not equal to the active LDID, then an LDID mismatch results (no match at step 322). An LDID mismatch results when the language driver originally used to process the index file differs from the language driver in the current session of the system. Because this mismatch can cause several problems (described above) it is trapped by the system (step 324). In a preferred embodiment, a language driver incompatibility dialog box 620 is displayed to the user for indicating the incompatibility. As shown in FIG. 6B, the user may instruct the system in how to proceed. If the user chooses "cancel", then the index file is not opened and the operation terminates (or optionally continues without an index) as described above for step 513. If, on the other hand, the user selects the "reindex" option, the index file is regenerated, with the value of the active LDID written to the local LDID in the index file's header. Again (as described above for step 513), the value of the active LDID is written to the header of each index tag. In the instance of a multiple index file, all of the indexes in the file are updated with the active language driver identifier. The behavior for local LDID values which are not zero may be summarized by the following table:

When Local Index LDID is not Zero

| Active Index LDID Matches Stored LDID? | Action |
| --- | --- |
| YES | open file with no message |
| NO | show index mismatch message; if file reindexed, set local LDID in .MDX or .NDX header to match active LDID, also set all local LDIDs in tag headers to match active LDID |

While the invention is described in some detail with specific reference to a single preferred embodiment and certain alternatives, there is no intent to limit the invention to that particular embodiment or those specific alternatives. For instance, while the preferred embodiment employs a byte-length identifier, a variety data types may serve in the manner of a descriptor of the present invention, including use of a self-contained locale descriptor (i.e., embedding necessary locale information within the data object). For those embodiments constrained by compatibility or storage space, the descriptor may be embodied in the form of a system-comparable unit, such as an ID byte which references an agreed-upon set of values (e.g., locale lookup table). Thus, the true scope of the present invention is not limited to any one of the foregoing exemplary embodiments but is instead defined by the following claims.

What is claimed is:

1. In a computer system, a method for storing National Language Support (NLS) identifiers in data objects created under different NLS configurations, the method comprising:

(a) defining a plurality of identifiers for indicating different NLS configurations;

(b) assigning one of said identifiers indicating an active identifier of the system to data objects created or modified by the system, said active identifier specifying the NLS configurations of the system when the data objects were created or modified by the system;

(c) storing the assigned identifier in each data object created or modified by the system as a local identifier of the data object, whereby the object includes information indicating a specific NLS configuration of the system when the object was created or modified;

(d) receiving a request to process a new data object; and (e) determining if the new data object may be appropriately processed by the system by comparing the local identifier of the data object to the active identifier of the system;

wherein each identifier references at least one character set and at least one language configurations table.

2. The method of claim 1, wherein each identifier is in the form of a system-comparable unit.

3. The method of claim 1, wherein each identifier is in the form of a byte (8-bit) data member.

4. The method of claim 1, wherein the identifier stored in each data object is positioned at a known location in each data object.

5. The method of claim 1, wherein at least one of the data objects is a database file, and wherein step (c) includes storing the assigned identifier at offset location Dx1D in the database file.

6. The method of claim 1, wherein at least one of the data objects is a single-index file, and wherein step (c) includes storing the assigned identifier at offset location OxOB in the single-index file.

7. The method of claim 1, wherein at least one of the data objects is a multiple-index file, and wherein step (c) includes storing the assigned identifier at offset location Ox1F in the multiple-index file.

8. The method of claim 1, wherein each identifier specifies a language driver by storing a value selected from one of:

| Value | Language Driver |
|---|---|
| 1 | US |
| 2 | INTL |
| 3 | JAPANESE |
| 4 | NORDAN |
| 5 | NORDAN4 |
| 6 | SWEDFIN | wherein the language driver is used for NLS configurations.

9. The method of claim 1, wherein each identifier specifies a language driver by storing a value selected from one of:

| Value | Language Driver |
|---|---|
| 7 | ARABIC |
| 8 | DANISH |
| 9 | DUTCH |
| 10 | DUTCH2 |
| 11 | FINNISH |
| 12 | FINNISH2 |
| 13 | FRENCH |
| 14 | FRENCH2 |
| 15 | GERMAN |
| 16 | GERMAN2 |
| 17 | ITALIAN |
| 18 | ITALIAN2 |
| 19 | JAPANESE |
| 20 | SPANISH2 |
| 21 | SWEDISH |
| 22 | SWEDISH2 |
| 23 | NORWEGIAN |
| 24 | SPANISH |
| 25 | UK |
| 26 | UK2 |
| 27 | US |
| 28 | FRENCHCAN |
| 29 | FRENCHCAN2 |
| 30 | FRENCHCAN3 |
| 31 | CZECH |
| 32 | CZECH2 |
| 33 | GREEK |
| 34 | HUNGARIAN |
| 35 | POLISH |
| 36 | PORTUGUESE |
| 37 | PORTUGUESE2 |
| 38 | RUSSIAN | where the language driver is used for NLS configurations.

10. The method of claim 1, wherein each identifier specifies a language driver by storing a value selected from one of:

| Value | Language Driver |
|---|---|
| 39 | DANISH |
| 40 | DUTCH |
| 41 | FINNISH |
| 42 | FRENCH |
| 43 | CANADIAN |
| 44 | GERMAN |
| 45 | ICELANDIC |
| 46 | ITALIAN |
| 47 | JAPANESE |
| 48 | NORWEGIAN |
| 49 | SPANISH |
| 50 | SPANISH2 |
| 51 | SWEDISH |
| 52 | UK |
| 53 | US |
| 54 | PORTUGUESE |
| 55 | US2 |
| 56 | INTL |
| 57 | INTL2 |
| 58 | SPANISH |
| 59 | ICELANDIC |
| 60 | INTL |
| 61 | INTL2 |
| 62 | SPANISH |
| 63 | SWEDFIN |
| 64 | NORDAN4 |
| 65 | NORWEGIAN2 |
| 66 | DANISH2 |
| 67 | ICELANDIC |
| 68 | ICELANDIC2 |
| 69 | TURKISH |
| 100 | CZECH |
| 101 | CZECH2 |
| 102 | POLISH |
| 103 | RUSSIAN |
| 104 | HUNGARIAN |
| 105 | GREEK |
| 106 | GREEK2 |
| 107 | HEBREW |
| 108 | ARABIC |
| 109 | SLOVENE |
| 110 | TURK |
| 111 | TURK2 |
| 112 | TURK3 |
| 113 | BULGARIAN |
| 114 | FARSI |
| 115 | ROMANIAN |
| 116 | ARABIC |
| 117 | HEBREW |
| 118 | HEBREW2 |
| 119 | HEBREW2 | wherein the language driver is used for NLS configurations.

11. A computer system storing National Language Support (NLS) identifiers in data objects created under different NLS configurations, the system comprising:

(a) a computer having a processor and a means for storing the data objects;

(b) means for defining a plurality of identifiers indicating different NLS configurations;

(c) means for assigning one of said identifiers indicating a current NLS configuration of the system to each data object created or modified by the system, wherein the assigned identifier specifies the NLS configuration of the system when each data object was created or modified by the system;

(d) means for storing the assigned identifier in each data object created or modified by the system, whereby the object includes information indicating a specific NLS configuration of the system when the object was created or modified;

(e) means for detecting a request to process a data object which was created or modified under a different NLS configuration than that which the system currently operates; and (f) means for comparing the stored identifier of the data object to the identifier of the NLS configuration which the system currently operates.

12. The system of claim 11, further comprising means for setting the NLS configuration which the system currently operates to match that of the data object requested to be processed.

* * * * *

UNITED STATES PATENT AND TRADEMARK OFFICE
CERTIFICATE OF CORRECTION

PATENT NO.    : 6,507,813 B2
DATED         : January 14, 2003
INVENTOR(S)   : Daniel P. Veditz et al.

It is certified that error appears in the above-identified patent and that said Letters Patent is hereby corrected as shown below:

Title page,
Item [73], Assignee, delete "Boland Software Corporation" and substitute -- Borland Software Corporation --.

Signed and Sealed this

Thirteenth Day of May, 2003

JAMES E. ROGAN
*Director of the United States Patent and Trademark Office*